(12) United States Patent
Mori et al.

(10) Patent No.: US 12,397,637 B2
(45) Date of Patent: Aug. 26, 2025

(54) REACTION FORCE IMPARTING DEVICE

(71) Applicant: DENSO CORPORATION, Kariya (JP)

(72) Inventors: Hideyuki Mori, Kariya (JP); Tetsuo Hariu, Kariya (JP); Noriyuki Inagaki, Kariya (JP); Rika Iwata, Kariya (JP); Soichi Kinouchi, Kariya (JP); Takuto Kita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/535,255

(22) Filed: Dec. 11, 2023

(65) Prior Publication Data

US 2024/0100945 A1 Mar. 28, 2024

Related U.S. Application Data

(63) Continuation of application No. PCT/JP2022/039173, filed on Oct. 20, 2022.

(30) Foreign Application Priority Data

Oct. 21, 2021 (JP) .................................. 2021-172618

(51) Int. Cl.
*B60K 26/02* (2006.01)
(52) U.S. Cl.
CPC .................................. *B60K 26/021* (2013.01)

(58) Field of Classification Search
CPC .................................. B60K 26/021; G05G 1/38
See application file for complete search history.

(56) References Cited

U.S. PATENT DOCUMENTS

| | | | | |
|---|---|---|---|---|
| 2012/0096976 | A1* | 4/2012 | Leone | G05G 1/30 |
| | | | | 74/513 |
| 2015/0360563 | A1 | 12/2015 | Horiuchi et al. | |
| 2016/0250924 | A1* | 9/2016 | Kouzuma | G05G 5/03 |
| | | | | 74/89 |
| 2019/0322172 | A1* | 10/2019 | O Meachair | B60W 30/143 |

FOREIGN PATENT DOCUMENTS

JP 2001310648 A * 11/2001

* cited by examiner

*Primary Examiner* — Daniel D Yabut
(74) *Attorney, Agent, or Firm* — Nixon & Vanderhye P.C.

(57) ABSTRACT

An actuator is provided in an actuator housing. A lever is provided in the actuator housing, rotates by driving force from the actuator, contacts an arm that rotates together with the pedal, and is capable of imparting a reaction force to the pedal against a driver's depression force. A fixing member is formed so that a pedal housing and the actuator housing are fixed apart from each other, and are attachable to a vehicle. A positioning portion determines a contact position between an arm and the lever and between a rotation axis of the pedal and a rotation axis of the lever.

10 Claims, 14 Drawing Sheets

REACTION FORCE IMPARTING DEVICE

CROSS-REFERENCE TO RELATED APPLICATIONS

This application is a continuation application of International Patent Application No. PCT/JP2022/039173 filed on Oct. 20, 2022, which designated the U.S. and based on and claims the benefits of priority of Japanese Patent Application No. 2021-172618 filed on Oct. 21, 2021. The entire disclosure of all of the above applications is incorporated herein by reference.

TECHNICAL FIELD

The present disclosure relates to a reaction force imparting device.

BACKGROUND

Conventionally, there has been known a reaction force imparting device that imparts a reaction force against a driver's depression force to a pedal of an accelerator device that includes a pedal that is depressed by a driver.

SUMMARY

An object of the present disclosure is to provide a reaction force imparting device that improves the accuracy of the reaction force applied to the pedal of the accelerator device.

The present disclosure provides a reaction force imparting device capable of imparting a reaction force against a driver's depression force to a pedal of an accelerator device, which includes a pedal that is depressed by a driver and a pedal housing that rotatably supports the pedal. The reaction force imparting device includes an actuator housing, an actuator, a lever, a fixing member, and a positioning portion.

The actuator is provided in the actuator housing. The lever is provided in the actuator housing, rotates by driving force from the actuator, contacts the pedal or an arm that rotates together with the pedal, and is capable of imparting the reaction force to the pedal against the driver's depression force.

The fixing member is formed so that the pedal housing and the actuator housing are fixed apart from each other, and are attached to the vehicle. The positioning portion determines a contact position between the pedal or the arm and the lever between the rotation axis of the pedal and the rotation axis of the lever.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
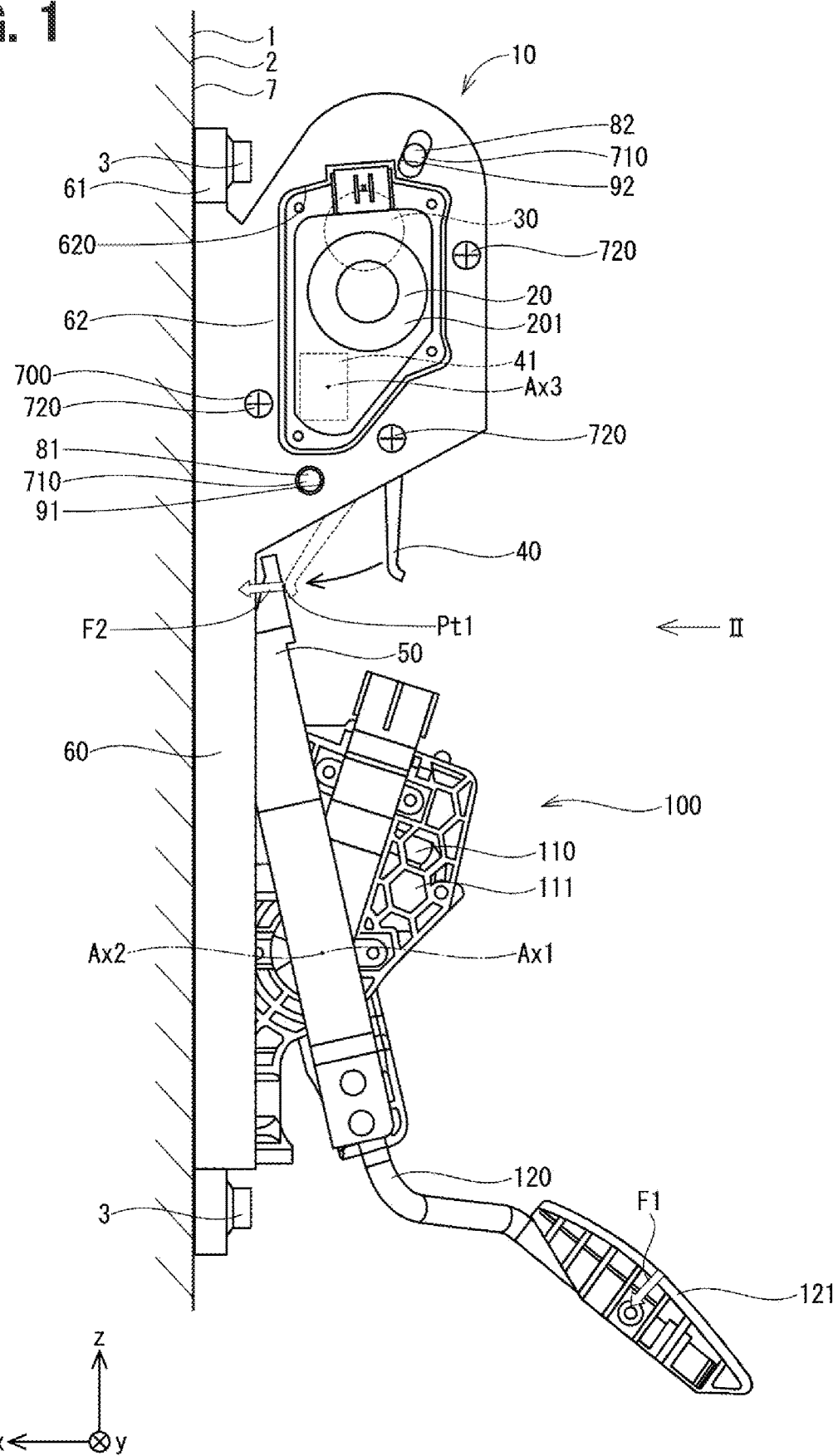
FIG. 1 is a diagram showing a reaction force imparting device of a first embodiment and an accelerator device to which the same is applied.

In an assumable example, there has been known a reaction force imparting device that imparts a reaction force against a driver's depression force to a pedal of an accelerator device that includes a pedal that is depressed by a driver. For example, the reaction force imparting device includes a lever that comes into contact with an arm that rotates together with a pedal of an accelerator device and can impart a reaction force to the pedal in response to a driver's depression force.

In the reaction force imparting device, when a distance between a contact point between an arm and a lever and a rotation axis of the arm is defined as L1, and a distance between the contact point between the arm and the lever and a rotation axis of the lever is defined as L2, a reaction force, or torque, generated by the reaction force imparting device is transmitted to the pedal by a factor of a lever ratio L1/L2. Therefore, when the position of the contact point between the arm and the lever changes, the lever ratio changes, which may affect the reaction force applied to the pedal.

By the way, the reaction force imparting device disclosed in Patent Document 1 is attached to a vehicle at a position a predetermined distance away from the accelerator device. That is, the reaction force imparting device and the accelerator device are each attached to different positions on the floor of the vehicle. Therefore, when an accuracy of the mounting positions of both is low, the contact point between the arm and the lever may deviate significantly, causing a change in the lever ratio, and there is a possibility that the reaction force generated from the reaction force imparting device deviates significantly from the target value.

An object of the present disclosure is to provide a reaction force imparting device that improves the accuracy of the reaction force applied to the pedal of the accelerator device.

The present disclosure provides a reaction force imparting device capable of imparting a reaction force against a driver's depression force to a pedal of an accelerator device, which includes a pedal that is depressed by a driver and a pedal housing that rotatably supports the pedal. The reaction force imparting device includes an actuator housing, an actuator, a lever, a fixing member, and a positioning portion.

The actuator is provided in the actuator housing. The lever is provided in the actuator housing, rotates by driving force from the actuator, contacts the pedal or an arm that rotates together with the pedal, and is capable of imparting the reaction force to the pedal against the driver's depression force.

The fixing member is formed so that the pedal housing and the actuator housing are fixed apart from each other, and are attached to the vehicle. The positioning portion determines a contact position between the pedal or the arm and the lever between the rotation axis of the pedal and the rotation axis of the lever.

Therefore, it is possible to improve the accuracy of the attachment positions of the pedal housing and the actuator housing to the vehicle, and it is possible to suppress misalignment of the contact point, which is the contact position between the pedal or the arm and the lever. Thereby, changes in the lever ratio can be suppressed and the reaction force generated from the reaction force imparting device can be brought closer to a target value. Therefore, the accuracy of the reaction force imparted to the pedal of the accelerator device can be improved.

Hereinafter, a reaction force imparting device according to a plurality of embodiments and an accelerator device to which the same is applied will be described based on the drawings. Components that are substantially the same in the plurality of embodiments are denoted by the same reference numerals and will not be described.

First Embodiment

Figure 2:
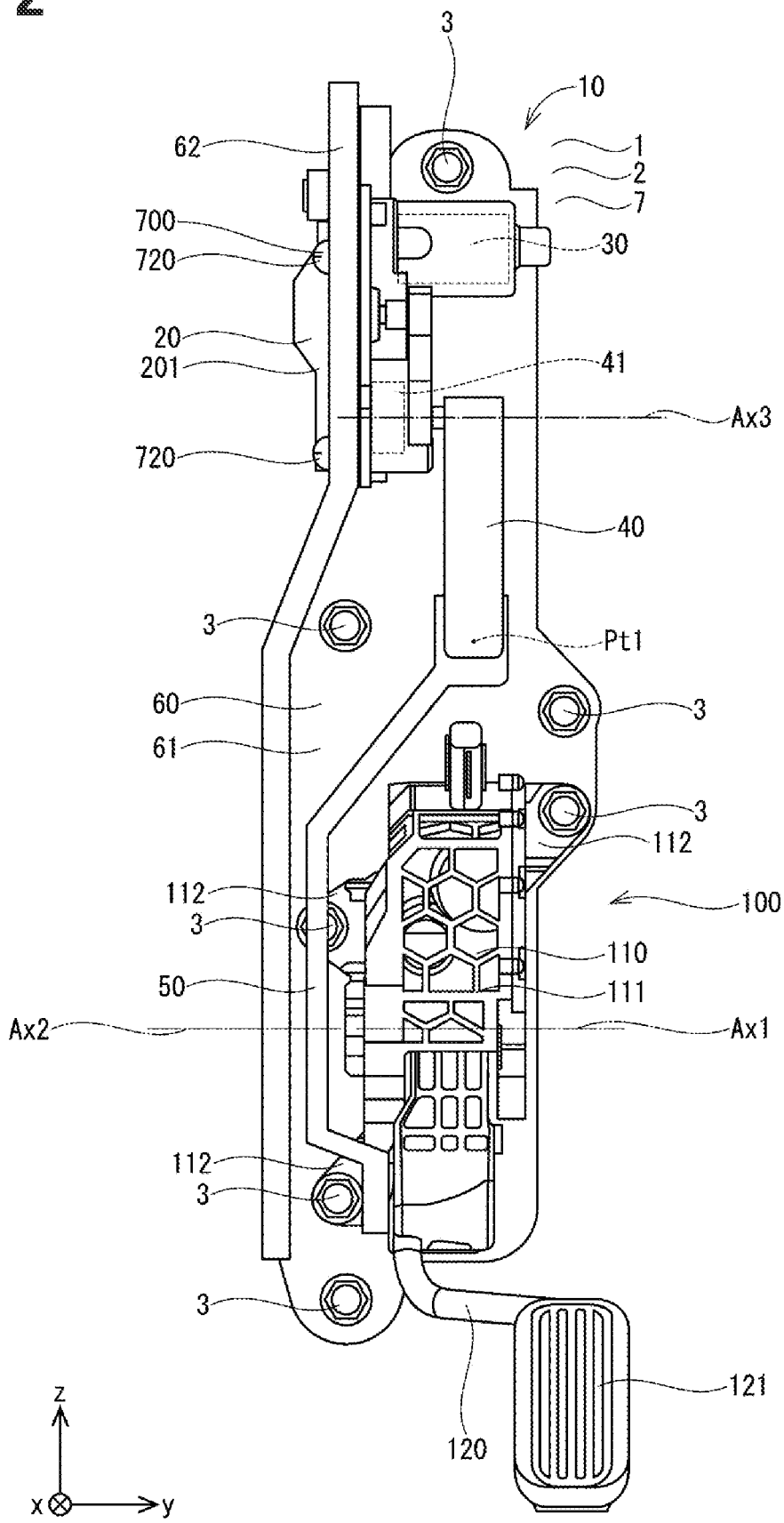
FIG. 2 is a diagram showing FIG. 1 viewed in a direction of an arrow II.

A reaction force imparting device according to a first embodiment and an accelerator device to which the same is applied are shown in FIGS. 1 and 2.

An accelerator device 100 is mounted on a vehicle 1 and is used to control a driving state of the vehicle 1 by detecting an accelerator opening degree corresponding to a rotation angle of a pedal 120 depressed by a driver. The accelerator device 100 employs an accelerator-by-wire system and is not mechanically connected to a throttle device of the vehicle 1. The accelerator device 100 transmits information regarding the accelerator opening degree corresponding to the rotation angle of the pedal 120 to an electronic control unit (hereinafter referred to as "ECU"), not shown. The ECU controls the throttle device based on the accelerator opening degree transmitted from the accelerator device 100. Thereby, a running state of the vehicle 1 is controlled.

A reaction force imparting device 10 is mounted on the vehicle 1 together with the accelerator device 100, and can impart a reaction force F2 to the pedal 120 of the accelerator device 100 in response to a driver's depression force F1. By imparting a reaction force to the pedal 120 of the accelerator device 100, the reaction force imparting device 10 can provide a driver notification such as a danger notification or a fuel efficiency improvement notification to the driver. Further, the reaction force imparting device 10 can use the pedal 120 as a footrest by regulating the rotation of the pedal 120.

The accelerator device 100 includes a pedal housing 110, a pedal 120, and the like. The pedal housing 110 has a housing body 111 and a housing attachment portion 112. The housing body 111 has a space inside that can accommodate components. The housing attachment portion 112 is formed integrally with the housing body 111 so as to protrude from the housing body 111. In the present embodiment, for example, three housing attachment portions 112 are formed (see FIG. 2). The pedal housing 110 is attached to a floor panel 2 by fixing the housing attachment portion 112 to a fixing member 60 (described later) using, for example, an attachment bolt 3, and fixing the fixing member 60 to the floor panel 2 of the vehicle 1.

In FIG. 1, an x-axis indicates a traveling direction of the vehicle 1, a y-axis indicates a width direction of the vehicle, and a z-axis indicates a vertically upward direction. Hereinafter, unless otherwise specified, the shape or configuration of the accelerator device 100 and the reaction force imparting device 10 in a state where they are attached to the vehicle 1 will be described. For example, the term "upward" or "upper side" means the upward or upper side of the accelerator device 100 or the reaction force imparting device 10 in a state where it is attached to the vehicle 1. Furthermore, in the present embodiment, the floor panel 2 has the wall surface 7 parallel to a yz plane. Here, "a state where it is attached to a vehicle" includes not only a state where it is directly attached to a vehicle but also a state where it is indirectly attached to a vehicle via other members (the same applies hereinafter).

One end of the pedal 120 is rotatably supported by the housing body 111 of the pedal housing 110 so as to rotate around a rotation axis Ax1. The other end of the pedal 120A is provided with a pad 121 that is depressed by the driver. Inside the housing body 111, an opening degree sensor (not shown) for the accelerator is provided on the rotation axis Ax1. The accelerator opening degree sensor detects the accelerator opening degree corresponding to the rotation angle of the pedal 120 rotated by the driver's depression operation, and transmits the detected accelerator opening degree to the ECU. The rotation axis Ax1 is set to be perpendicular to the z-axis and the x-axis, and parallel to the y-axis.

A pedal biasing member (not shown) is provided inside the housing body 111 of the pedal housing 110. The pedal 120 is biased in the accelerator closing direction by a pedal biasing member. The pedal housing 110 has a stopper that restricts rotation of the pedal 120 in an accelerator closing direction and a stopper that restricts rotation of the pedal 120 in an accelerator opening direction. The pedal 120 is rotatable within a range in which it contacts both stoppers. FIG. 1 shows a state in which the pedal 120 is in contact with a stopper in the accelerator closing direction, that is, a state in which the accelerator is fully closed.

As shown in FIGS. 1 and 2, the reaction force imparting device 10 includes an actuator housing 20, an actuator 30, a lever 40, the fixing member 60, and a positioning portion 700.

The actuator 30 is provided in the actuator housing 20. The lever 40 is provided in the actuator housing 20, rotates by driving force from the actuator 30, contacts an arm 50 that rotates together with the pedal 120, and is capable of imparting the reaction force to the pedal 120 against the driver's depression force.

Figure 3:
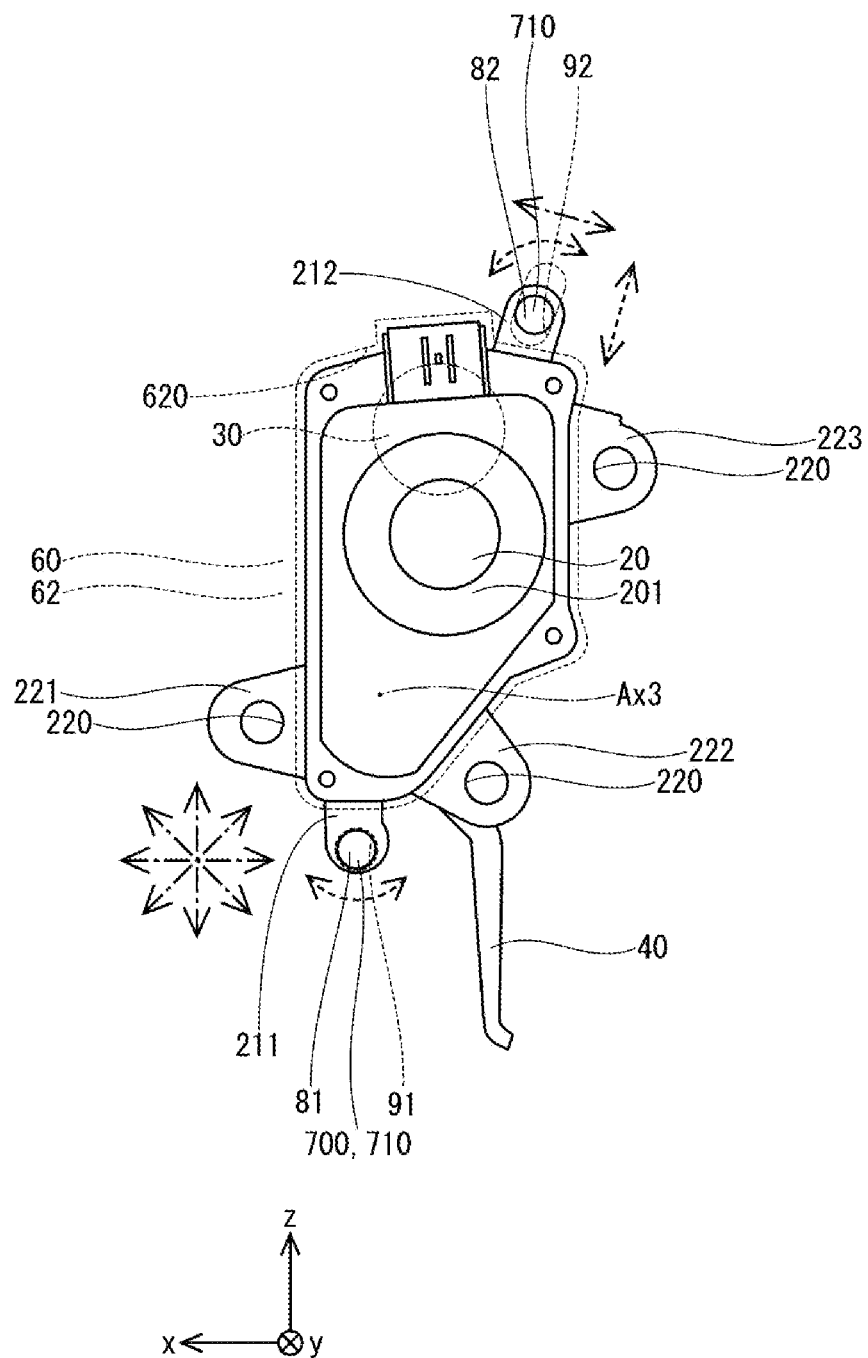
FIG. 3 is a diagram showing a part of the reaction force imparting device of the first embodiment.

More specifically, as shown in FIG. 3, the actuator housing 20 includes a housing main body 201, a housing extension portion 211, a housing extension portion 212, a housing fastening portion 221, a housing fastening portion 222, a housing fastening portion 223, etc. The housing main body 201 has a space formed therein for accommodating the actuator 30 and the like.

The housing extension portion 211, the housing extension portion 212, the housing fastening portion 221, the housing fastening portion 222, and the housing fastening portion 223 are formed to protrude from an outer edge of the housing main body 201. A fastening hole 220 is formed in the housing fastening portion 221, the housing fastening portion 222, and the housing fastening portion 223.

The actuator housing 20 is fixed to the fixing member 60 (described later) and is attached to the floor panel 2 by fixing the fixing member 60 to the wall surface 7 of the floor panel 2 of the vehicle 1.

The actuator 30 is, for example, an electric motor, and is housed within the housing main body 201 of the actuator housing 20. The actuator 30 can output torque as a driving force when energized. The ECU can control power supply to the actuator 30 and control the operation of the actuator 30. A speed reducer (not shown) consisting of a plurality of gears is provided within the housing main body 201. The speed reducer can reduce the torque of the actuator 30 and output it.

One end of the lever 40 is rotatably supported by the actuator housing 20 so as to rotate around the rotation axis Ax3. One end of the lever 40 is connected to the speed reducer within the housing main body 201. The lever 40 rotates around the rotation axis Ax3 by the driving force from the actuator 30 output from the speed reducer.

In the present embodiment, the arm 50 is provided on the accelerator device 100. The arm 50 is formed into a bending rod shape and is attached to the pedal 120 so that one end thereof is fixed to the pedal 120. This allows the arm 50 to rotate together with the pedal 120. Therefore, the rotation axis Ax2 of the arm 50 coincides with the rotation axis Ax1 of the pedal 120.

The other end of the lever 40, that is, the end opposite to the rotation axis Ax3, can come into contact with the other end of the arm 50, that is, the end opposite to the pedal 120. The lever 40 is rotated by the driving force from the actuator 30, contacts the other end of the arm 50 that rotates together with the pedal 120, and imparts the reaction force F2 to the arm 50 in response to the driver's depression force F1. Therefore, the reaction force F2 can be applied to the pedal 120 via the arm 50.

The fixing member 60 is formed so that the pedal housing 110 and the actuator housing 20 can be fixed apart from each other, and can be attached to the vehicle 1. The positioning portion 700 determines a contact position Pt1 between the arm 50 and the lever 40 and between the rotation axis Ax1 of the pedal 120 and the rotation axis Ax3 of the lever 40.

More specifically, the fixing member 60 has a fixing member main body 61 and a fixing member wall portion 62. The fixing member main body 61 is formed into a long plate shape. The fixing member wall portion 62 is formed to extend perpendicularly from the outer edge of the fixing member main body 61 in a plate shape. A housing corresponding hole 620 is formed in the fixing member wall portion 62. The housing corresponding hole 620 has a shape corresponding to the shape of the housing main body 201 of the actuator housing 20, and has a size such that a predetermined gap is formed between the housing corresponding hole 620 and the housing main body 201 when the housing main body 201 is inserted into the housing corresponding hole 620.

In the pedal housing 110, a housing attachment portion 112 is fixed to the fixing member main body 61 of the fixing member 60 by, for example, the attachment bolt 3. Furthermore, the actuator housing 20 is fixed to the fixing member wall portion 62 of the fixing member 60 in a state where the housing main body 201 is inserted into the housing corresponding hole 620. The fixing member 60 is attached to the floor panel 2 by fixing the fixing member main body 61 to the floor panel 2 of the vehicle 1 using, for example, the attachment bolts 3 (see FIGS. 1 and 2). In this way, the fixing member 60 is formed so that the pedal housing 110 and the actuator housing 20 can be fixed apart from each other, and can be attached to the vehicle 1.

In the present embodiment, the positioning portion 700 is provided with a plurality of position regulating parts 710 each consisting of a boss provided on either the actuator housing 20 or the fixing member 60 and a hole provided on the other of the actuator housing 20 or the fixing member 60 so that the boss can be inserted therein, and also has at least one fastening part 720 that fastens the actuator housing 20 and the fixing member 60.

The position regulating part 710 regulates a relative rotation of the boss with respect to the hole, or a relative movement of the boss with respect to the hole in a direction perpendicular to an axis of the boss, and can regulate a relative position of the actuator housing 20 with respect to the fixing member 60 at any position.

More specifically, the positioning portion 700 has two position regulating parts 710 and three fastening parts 720. One of the two position regulating parts 710 includes a boss 81 and a hole 91. The boss 81 is formed to protrude in a cylindrical shape from the housing extension portion 211 of the actuator housing 20 (see FIG. 3). The hole 91 is formed at a predetermined distance from the housing corresponding hole 620 so as to penetrate the fixing member wall portion 62 of the fixing member 60 in a circular manner (see FIG. 1). An inner diameter of the hole 91 is slightly larger than an outer diameter of the boss 81. The hole 91 is formed into which the boss 81 can be inserted.

The other of the two position regulating parts 710 includes a boss 82 and a hole 92. The boss 82 is formed to protrude in a cylindrical shape from the housing extension portion 212 of the actuator housing 20 (see FIG. 3). The hole 92 is formed at a predetermined distance from the housing corresponding hole 620 so as to penetrate the fixing member wall portion 62 of the fixing member 60 in a rounded rectangular shape (see FIG. 1). Here, the term "rounded rectangular shape" means a figure consisting of two parallel lines of equal length and two semicircles (the same applies hereinafter). The hole 92 is formed such that a line along a longer side direction is inclined with respect to the yz plane. An inner diameter of the hole 92 in a lateral direction is slightly larger than an outer diameter of the boss 82. The hole 92 is formed into which the boss 82 can be inserted.

The fastening part 720 is, for example, a bolt. The bolt is formed in the fixing member wall portion 62 at a position corresponding to the fastening hole 220 of the actuator housing 20 when the housing main body 201 is inserted into the housing corresponding hole 620. The fastening part 720 can fasten the actuator housing 20 and the fixing member 60 by passing through the bolt hole and screwing into the fastening hole 220 of the actuator housing 20.

FIG. 3 shows a state of the fixing member wall portion 62 and the actuator housing 20 when the boss 81 is inserted into the hole 91 and the boss 82 is inserted into the hole 92. Although the hole 91 allows a relative rotation of the boss 81 with respect to the hole 91, it restricts a relative movement in the radial direction of the boss 81 with respect to the hole 91. On the other hand, although the hole 92 allows the relative rotation of the boss 82 with respect to the hole 92 and the relative movement of the boss 82 with respect to the hole 92 in a longer side direction of the hole 92, it restricts the relative movement of the boss 82 with respect to the hole 92 in a shorter side direction of the hole 92. That is, the position regulating part 710 regulates the relative movement of the bosses 81 and 82 with respect to the holes 91 and 92 in a direction perpendicular to the axes of the bosses 81 and 82.

In FIG. 3, the dashed arrows indicate the directions of relative movement and relative rotation of the bosses 81, 82 with respect to the holes 91, 92, which are permitted by the position regulating part 710. The dashed-dotted arrow indicates the direction of relative movement or relative rotation of the bosses 81 and 82 with respect to the holes 91 and 92, which is regulated by the position regulating part 710.

As shown in FIG. 3, the holes 91 and 92 restrict a movement, that is, a translation movement, of the bosses 81 and 82 in the surface direction of the xz plane. Furthermore, the regulation directions by the position regulating part 710 have at least different directions and is not determined by the same rotatable center.

In the reaction force imparting device 10 of the present embodiment, when a distance L1 between a contact point between the arm 50 and the lever 40, that is, a contact position Pt1, and the rotation axis Ax2 of the arm 50 is defined as L1, and a distance between the contact point between the arm 50 and the lever 40 and a rotation axis Ax3 of the lever 40 is defined as L2, the reaction force F2, or torque, generated by the reaction force imparting device 10 is transmitted to the pedal 120 by a factor of a lever ratio L1/L2.

The present embodiment further includes a lock portion 41 that can restrict the rotation of the pedal 120 by restricting the rotation of the lever 40.

More specifically, the lock portion 41 is provided within the housing main body 201 of the actuator housing 20. The lock portion 41 is operated by the ECU and can restrict the rotation of the lever 40. With this configuration, for example, when the pedal 120 is in the accelerator fully closed position, the rotation of the lever 40 is restricted by the lock portion 41 while the lever 40 is in contact with the arm 50, thereby making it possible to reliably use the pedal 120 as the footrest.

As described above, in the present embodiment, the positioning portion 700 determines the contact position Pt1 between the arm 50 and the lever 40 between the rotation axis Ax1 of the pedal 120 and the rotation axis Ax3 of the lever 40.

Therefore, it is possible to improve the accuracy of the attachment positions of the pedal housing 110 and the actuator housing 20 to the vehicle 1, and it is possible to suppress misalignment of the contact point Pt1, which is the contact position between the arm 50 and the lever 40. Thereby, changes in the lever ratio can be suppressed and the reaction force F2 generated from the reaction force imparting device 10 can be brought closer to a target value. Therefore, the accuracy of the reaction force imparted to the pedal 120 of the accelerator device 100 can be improved.

Furthermore, in the present embodiment, the positioning portion 700 is provided with a plurality of position regulating parts 710 each consisting of a boss provided on either the actuator housing 20 or the fixing member 60 and a hole provided on the other of the actuator housing 20 or the fixing member 60 so that the boss can be inserted therein, and also has at least one fastening part 720 that fastens the actuator housing 20 and the fixing member 60.

The position regulating part 710 regulates a relative rotation of the boss with respect to the hole, or a relative movement of the boss with respect to the hole in a direction perpendicular to an axis of the boss, and can regulate a relative position of the actuator housing 20 with respect to the fixing member 60 at any position.

In the present embodiment, the positioning portion 700 has a plurality of position regulating parts 710 spaced apart by a predetermined distance, so that the contact position Pt1 between the arm 50 and the lever 40 can be determined more accurately. Therefore, the accuracy of the reaction force applied to the pedal 120 of the accelerator device 100 can be further improved.

The present embodiment further includes a lock portion 41 that can restrict the rotation of the pedal 120 by restricting the rotation of the lever 40. By regulating the rotation of the lever 40 with the lock portion 41 while the lever 40 is in contact with the arm 50, the pedal 120 can be reliably used as a footrest. As a result, the reaction force imparting device 10 can have a function of reliably using the pedal 120 as the footrest in addition to the function of applying a reaction force to the pedal 120, and can appropriately respond to requests for variations in the reaction force imparting device 10.

Second Embodiment

Figure 4:
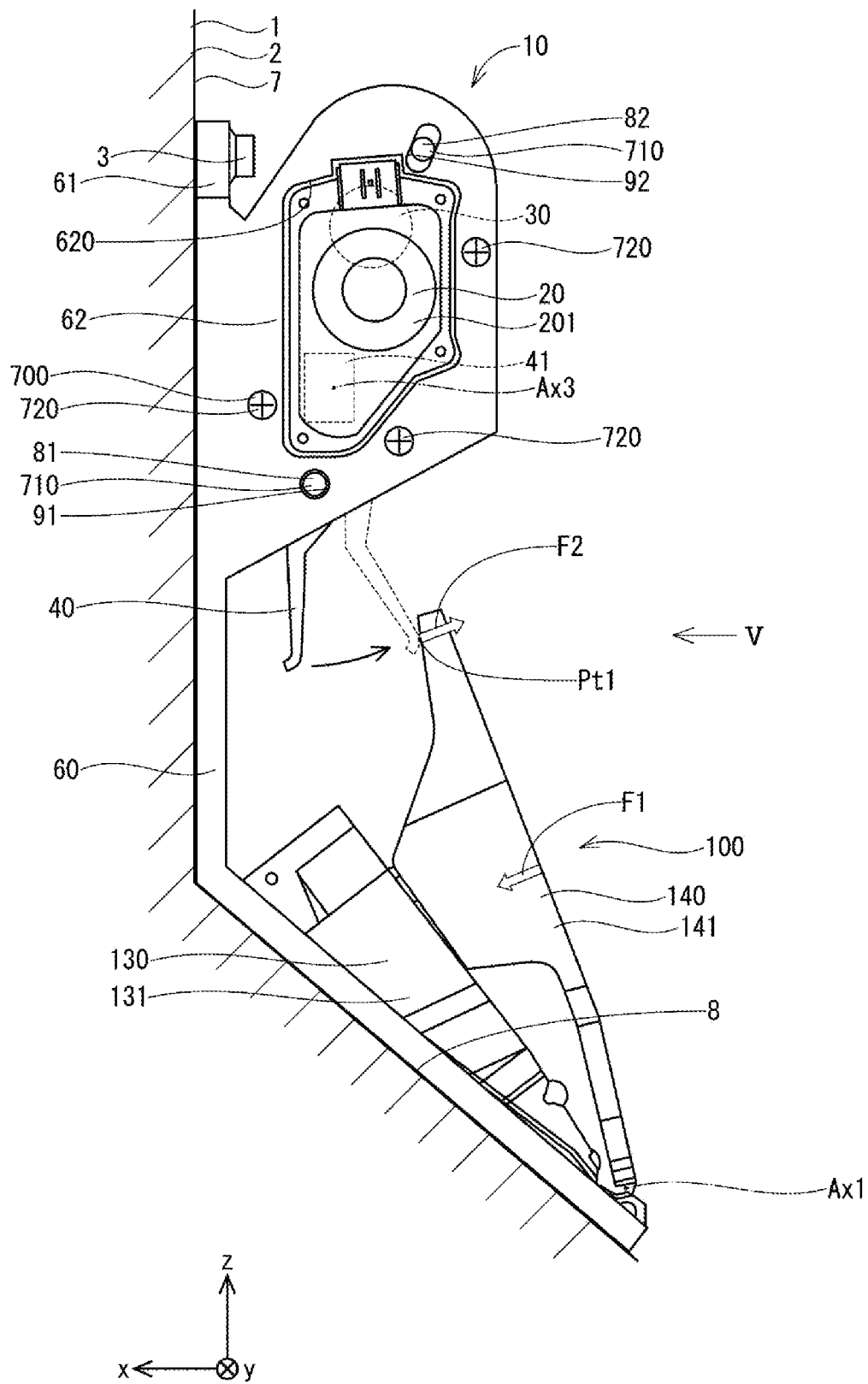
FIG. 4 is a diagram showing a reaction force imparting device of a second embodiment and an accelerator device to which the same is applied.
Figure 5:
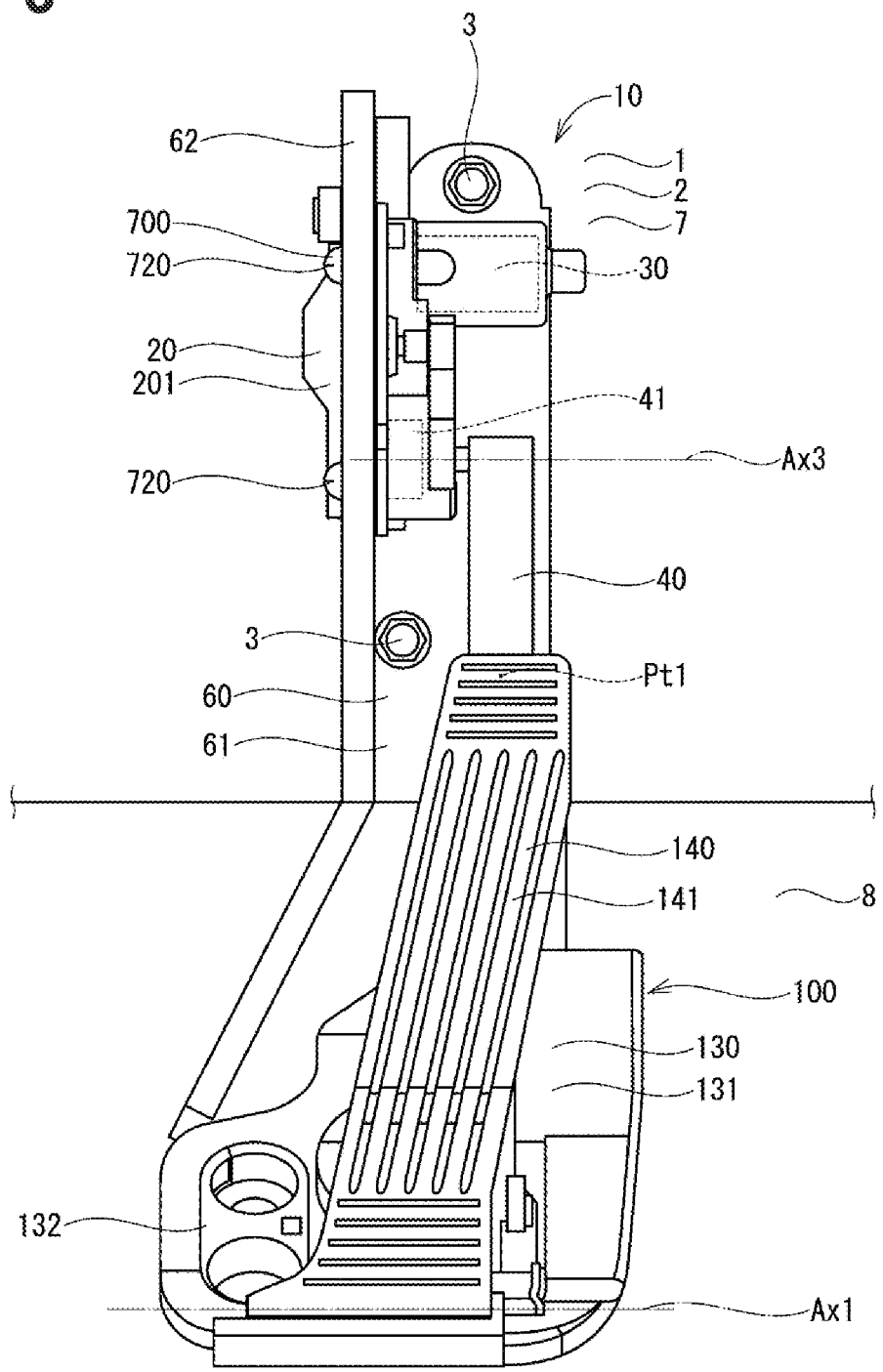
FIG. 5 is a diagram showing FIG. 4 viewed from a direction of an arrow V.

The reaction force imparting device and the accelerator device according to a second embodiment are shown in FIGS. 4 and 5. The second embodiment differs from the first embodiment in the configurations of the accelerator device 100 and the fixing member 60, etc.

In the present embodiment, the accelerator device 100 includes a pedal housing 130, a pedal 140, and the like. The pedal housing 130 has a housing body 131 and a housing attachment portion 132. The housing body 131 is formed to be able to accommodate or install components. The housing attachment portion 132 is formed integrally with the housing body 131 so as to protrude from the housing body 131. The pedal housing 130 is attached to the floor panel 2 by fixing the housing attachment portion 132 to the fixing member 60, and fixing the fixing member 60 to the floor panel 2 of the vehicle 1.

In the present embodiment, the floor panel 2 has the wall surface 7 parallel to the yz plane and a wall surface 8 inclined with respect to the wall surface 7.

The pedal 140 is rotatably supported by the housing body 131 of the pedal housing 130 so as to rotate around the rotation axis Ax1. The pedal 140 is provided with a substantially rectangular plate-shaped pad 141 that is depressed by the driver. The housing body 131 is provided with an opening degree sensor of the accelerator (not shown). The accelerator opening degree sensor detects the accelerator opening degree corresponding to the rotation angle of the pedal 140 rotated by the driver's depression operation, and transmits the detected accelerator opening degree to the ECU. The rotation axis Ax1 is set to be perpendicular to the z-axis and the x-axis, and parallel to the y-axis.

A pedal biasing member (not shown) is provided inside the housing body 131 of the pedal housing 130. The pedal 140 is biased in the accelerator closing direction by a pedal biasing member. The pedal housing 130 has a stopper that restricts rotation of the pedal 140 in an accelerator closing direction and a stopper that restricts rotation of the pedal 120 in an accelerator opening direction. The pedal 140 is rotatable within a range in which it contacts both stoppers. FIG. 4 shows a state in which the pedal 140 is in contact with a stopper in the accelerator closing direction, that is, a state in which the accelerator is fully closed.

In the present embodiment, the fixing member main body 61 of the fixing member 60 is formed into a bent plate shape so as to correspond to the shapes of the wall surfaces 7 and 8 of the floor panel 2. The configuration of the fixing member wall portion 62 and the configuration of the positioning portion 700 are the same as those in the first embodiment.

In the pedal housing 130, a housing attachment portion 132 is fixed to a lower part of a fixing member main body 61 of the fixing member 60. Furthermore, like the first embodiment, the actuator housing 20 is fixed to the fixing member wall portion 62 of the fixing member 60 in a state where the housing main body 201 is inserted into the housing corresponding hole 620. The fixing member 60 is attached to the wall surfaces 7 and 8 of the floor panel 2 by fixing the fixing member main body 61 to the floor panel 2 of the vehicle 1 using, for example, the attachment bolts 3 (see FIGS. 4 and 5). In this way, the fixing member 60 is formed so that the pedal housing 130 and the actuator housing 20 can be fixed apart from each other, and can be attached to the vehicle 1.

In the present embodiment, the arm 50 is not provided in the accelerator device 100. The end of the lever 40 on the side opposite to the rotation axis Ax3 can come into contact with the end of the pad 141 of the pedal 140 on the side opposite to the rotation axis Ax1. The lever 40 is rotated by the driving force from the actuator 30, comes into contact with the pad 141 of the pedal 140, and can impart the reaction force F2 to the pedal 140 in response to the depression force F1 by the driver.

In the present embodiment, the positioning portion 700 determines a contact position Pt1 between the pedal 140 and the lever 40 between the rotation axis Ax1 of the pedal 140 and the rotation axis Ax3 of the lever 40.

As explained above, the present embodiment includes the positioning portion 700 similar to that of the first embodiment. Therefore, it is possible to improve the accuracy of the attachment positions of the pedal housing 130 and the actuator housing 20 to the vehicle 1, and it is possible to suppress misalignment of the contact point Pt1, which is the contact position between the pedal 140 and the lever 40. Therefore, like the first embodiment, the accuracy of the reaction force imparted to the pedal 140 of the accelerator device 100 can be improved.

Third Embodiment

Figure 6:
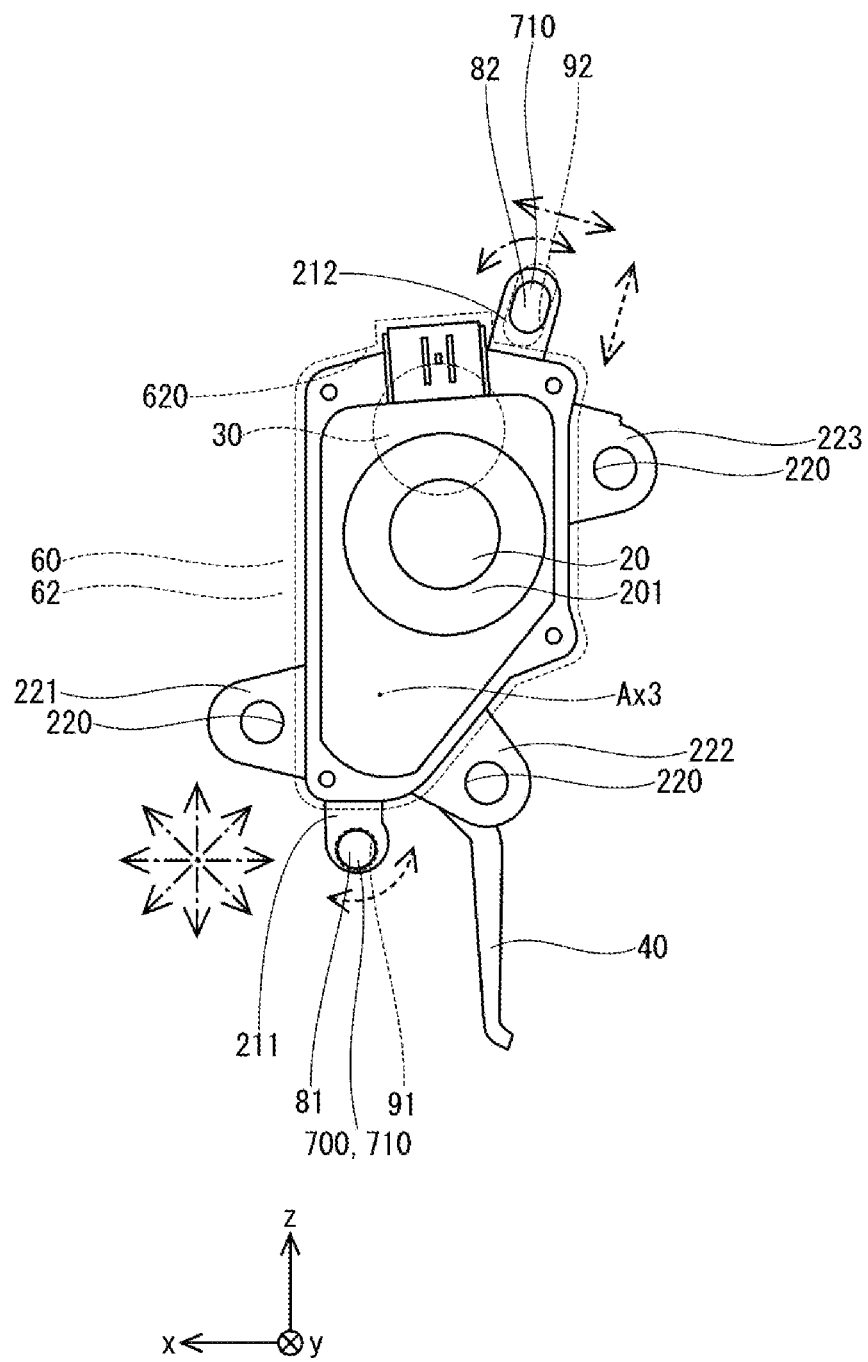
FIG. 6 is a diagram showing a part of the reaction force imparting device of a third embodiment.

A part of the reaction force imparting device according to the third embodiment is shown in FIG. 6. The third embodiment differs from the first embodiment in the configuration of a position regulating part 710.

In the present embodiment, the boss 82 is formed such that the cross-sectional shape taken along a plane perpendicular to the axis of the boss 82 has a rounded rectangular shape. The boss 82 is formed such that a line along the longer side direction in a cross section of the boss 82 is inclined with respect to the yz plane. A line along the longer side direction of the hole 92 substantially coincides with a line along the longer side direction in the cross section of the boss 82. The inner diameter of the hole 92 in the shorter side direction is slightly larger than the outer diameter in the shorter side direction in the cross section of the boss 82. The inner diameter of the hole 92 in the longer side direction is larger than the outer diameter in the longer side direction in the cross section of the boss 82. The hole 92 is formed into which the boss 82 can be inserted.

FIG. 6 shows a state of the fixing member wall portion 62 and the actuator housing 20 when the boss 81 is inserted into the hole 91 and the boss 82 is inserted into the hole 92. Although the hole 91 allows a relative rotation of the boss 81 with respect to the hole 91, it restricts a relative movement in the radial direction of the boss 81 with respect to the hole 91. On the other hand, although the hole 92 allows the relative movement of the hole 92 of the boss 82 with respect to the hole 92 in the longer side direction, it restricts the relative movement of the hole 92 of the boss 82 with respect to the hole 92 in the shorter side direction, and the relative rotation of the boss 82 with respect to the hole 92. That is, the position regulating part 710 regulates the relative movement of the bosses 81 and 82 with respect to the holes 91 and 92 in the direction perpendicular to the axes of the bosses 81 and 82, and the relative rotation of the boss 82 with respect to the hole 92.

In FIG. 6, the dashed arrows indicate the directions of relative movement and relative rotation of the bosses 81, 82 with respect to the holes 91, 92, which are permitted by the position regulating part 710. The dashed-dotted arrow indicates the direction of relative movement or relative rotation of the bosses 81 and 82 with respect to the holes 91 and 92, which is regulated by the position regulating part 710.

As shown in FIG. 6, the holes 91 and 92 restrict a movement, that is, a translation movement, of the bosses 81 and 82 in the surface direction of the xz plane. Further, the hole 92 restricts the rotational position of the boss 82. Furthermore, the regulation directions by the position regulating part 710 have at least different directions and is not determined by the same rotatable center.

Fourth Embodiment

Figure 7:
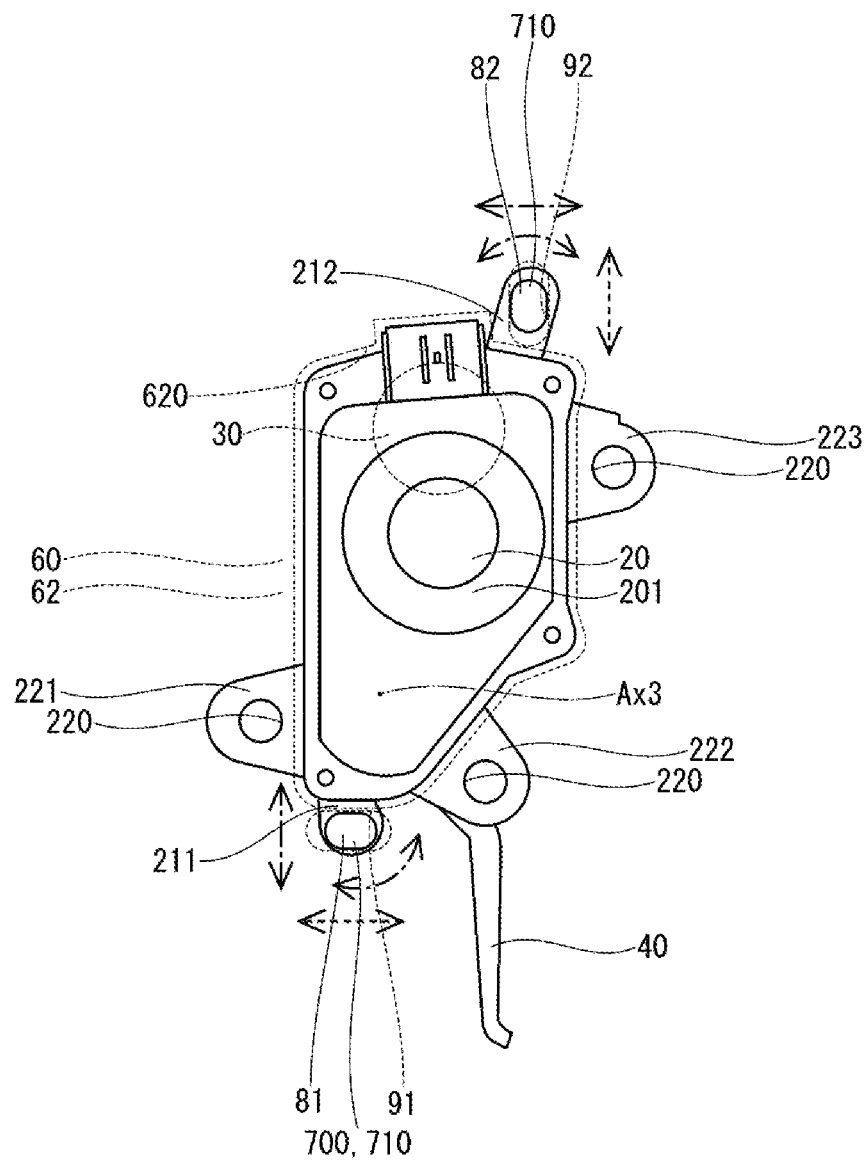
FIG. 7 is a diagram showing a part of the reaction force imparting device of a fourth embodiment.

A part of the reaction force imparting device according to a fourth embodiment is shown in FIG. 7. The fourth embodiment differs from the third embodiment in the configuration of a position regulating part 710.

In the present embodiment, the hole 91 is formed to penetrate the fixing member wall portion 62 of the fixing member 60 in the rounded rectangular shape. The hole 91 is formed such that a line along a longer side direction is parallel to the x-axis. The boss 81 is formed such that the cross-sectional shape taken along a plane perpendicular to the axis of the boss 81 has the rounded rectangular shape. The boss 81 is formed such that a line along the longer side direction of the cross section of the boss 81 is parallel to the x-axis. A line along the longer side direction of the hole 91 substantially coincides with a line along the longer side direction in the cross section of the boss 81. The inner diameter of the hole 91 in the shorter side direction is slightly larger than the outer diameter in the shorter side direction in the cross section of the boss 81. The inner diameter of the hole 91 in the longer side direction is larger than the outer diameter in the longer side direction in the cross section of the boss 81. The hole 91 is formed into which the boss 81 can be inserted.

The hole 92 is formed such that a line along the longer side direction is parallel to the z-axis. The boss 82 is formed such that a line along the longer side direction of the cross section of the boss 82 is parallel to the z-axis.

FIG. 7 shows a state of the fixing member wall portion 62 and the actuator housing 20 when the boss 81 is inserted into the hole 91 and the boss 82 is inserted into the hole 92. The hole 91 allows the relative movement of the boss 81 with respect to the hole 91 in the longer side direction of the hole 91, but restricts the relative movement of the boss 81 with respect to the hole 91 in the shorter side direction of the hole 91 and the relative rotation of the boss 81 with respect to the hole 91. On the other hand, the hole 92 allows the relative movement of the boss 82 with respect to the hole 92 in the longer side direction of the hole 92, but restricts the relative movement of the boss 82 with respect to the hole 92 in the shorter side direction of the hole 92 and the relative rotation of the boss 82 with respect to the hole 92. That is, the position regulating part 710 regulates the relative movement of the bosses 81 and 82 with respect to the holes 91 and 92 in the direction perpendicular to the axes of the bosses 81 and 82, and the relative rotation of the bosses 81 and 82 with respect to the holes 91 and 92.

In FIG. 7, the dashed arrows indicate the directions of relative movement and relative rotation of the bosses 81, 82 with respect to the holes 91, 92, which are permitted by the position regulating part 710. The dashed-dotted arrow indicates the direction of relative movement or relative rotation of the bosses 81 and 82 with respect to the holes 91 and 92, which is regulated by the position regulating part 710.

As shown in FIG. 7, the holes 91 and 92 restrict a movement, that is, a translation movement, of the bosses 81 and 82 in the surface direction of the xz plane. Further, the holes 91 and 92 restricts the rotational position of the bosses 81 and 82. Furthermore, the regulation directions by the position regulating part 710 have at least different directions and is not determined by the same rotatable center.

Fifth Embodiment

Figure 8:
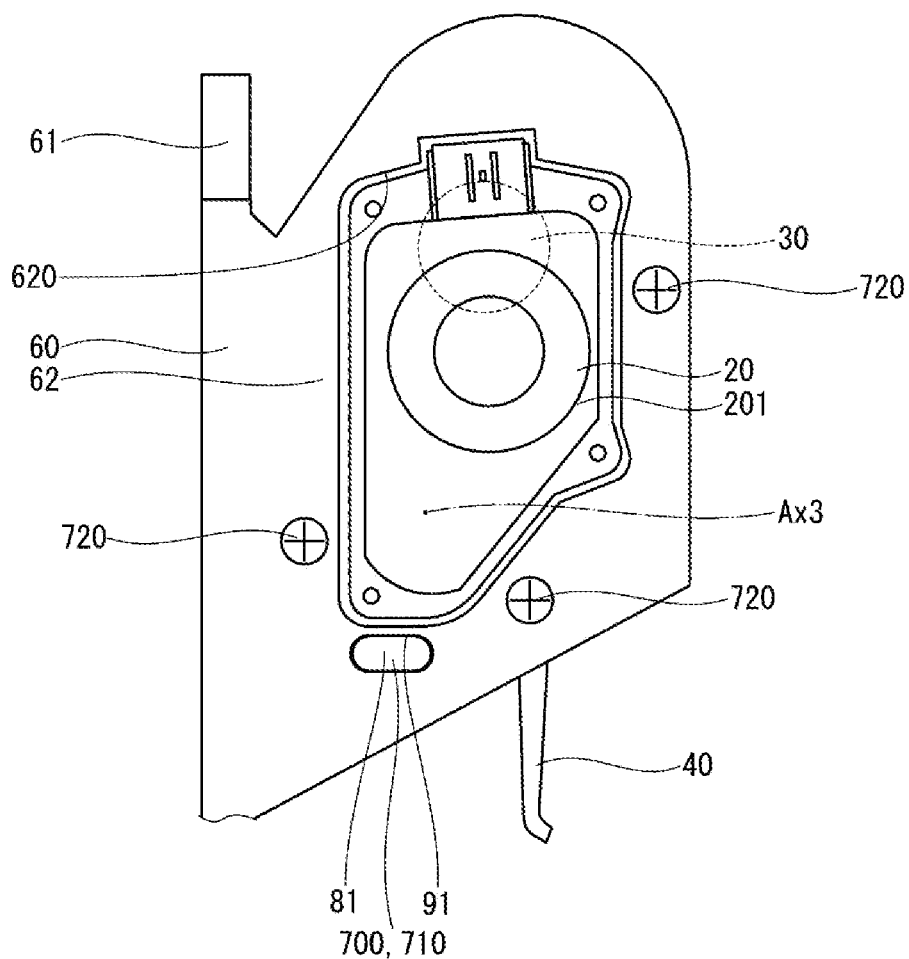
FIG. 8 is a diagram showing a part of the reaction force imparting device of a fifth embodiment.
Figure 9:
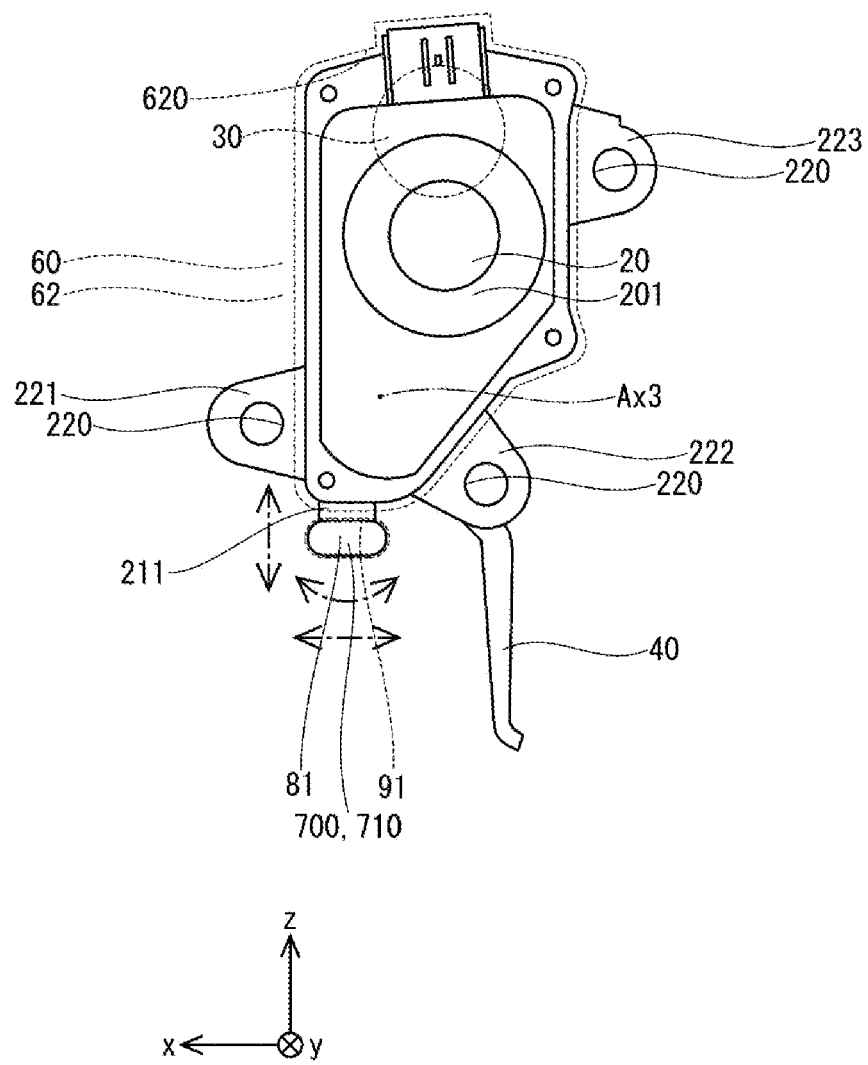
FIG. 9 is a diagram showing a part of the reaction force imparting device of the fifth embodiment.

A part of the reaction force imparting device according to a fifth embodiment is shown in FIGS. 8 and 9. The fifth embodiment differs from the fourth embodiment in the configuration of the positioning portion 700.

Furthermore, in the present embodiment, the positioning portion 700 is provided with one position regulating part 710 each consisting of a boss provided on either the actuator housing 20 or the fixing member 60 and a hole provided on the other of the actuator housing 20 or the fixing member 60 so that the boss can be inserted therein, and also has at least one fastening part 720 that fastens the actuator housing 20 and the fixing member 60.

The position regulating part 710 regulates the relative rotation of the boss with respect to the hole and the relative movement of the boss with respect to the hole in a direction perpendicular to an axis of the boss, and can regulate a relative position of the actuator housing 20 with respect to the fixing member 60 at any position.

More specifically, the positioning portion 700 has one position regulating part 710 and three fastening parts 720. The position regulating part 710 includes a boss 81 and a hole 91. The boss 81 is formed to protrude from the housing extension portion 211 of the actuator housing 20.

In the present embodiment, the hole 91 is formed to penetrate the fixing member wall portion 62 of the fixing member 60 in the rounded rectangular shape. The hole 91 is formed such that a line along a longer side direction is parallel to the x-axis. The boss 81 is formed such that the cross-sectional shape taken along a plane perpendicular to the axis of the boss 81 has the rounded rectangular shape. The boss 81 is formed such that a line along the longer side direction of the cross section of the boss 81 is parallel to the x-axis. A line along the longer side direction of the hole 91 substantially coincides with a line along the longer side direction in the cross section of the boss 81. The inner diameter of the hole 91 in the shorter side direction is slightly larger than the outer diameter in the shorter side direction in the cross section of the boss 81. The inner diameter of the hole 91 in the longer side direction is slightly larger than the outer diameter in the longer side direction in the cross section of the boss 81. The hole 91 is formed into which the boss 81 can be inserted.

In the present embodiment, the actuator housing 20 does not have the housing extension portion 212.

FIG. 9 shows the state of the fixing member wall portion 62 and the actuator housing 20 when the boss 81 is inserted into the hole 91. The hole 91 restricts the relative movement of the hole 91 of the boss 81 with respect to the hole 91 in the longer side direction, the relative movement of the hole 91 of the boss 81 with respect to the hole 91 in the shorter side direction, and the relative movement of the boss 81 with respect to the hole 91. That is, the position regulating part 710 restricts the relative movement of the boss 81 with respect to the hole 91 in the direction perpendicular to the axes of the boss 81, and restricts the relative rotation of the boss 81 with respect to the hole 91.

As shown in FIG. 9, the dashed-dotted arrow indicates the direction of relative movement or relative rotation of the boss 81 with respect to the hole 91, which is regulated by the position regulating part 710.

As described above, in the present embodiment, the positioning portion 700 is provided with one position regulating part 710 each consisting of a boss provided on either the actuator housing 20 or the fixing member 60 and a hole provided on the other of the actuator housing 20 or the fixing member 60 so that the boss can be inserted therein, and also has at least one fastening part 720 that fastens the actuator housing 20 and the fixing member 60.

The position regulating part 710 regulates the relative rotation of the boss with respect to the hole and the relative movement of the boss with respect to the hole in a direction perpendicular to an axis of the boss, and can regulate a relative position of the actuator housing 20 with respect to the fixing member 60 at any position.

In the present embodiment, the position of the reaction force imparting device 10 on the fixing member 60 can be determined with a relatively simple configuration, and the contact position Pt1 between the arm 50 and the lever 40 can be determined with high accuracy.

Sixth Embodiment

Figure 10:
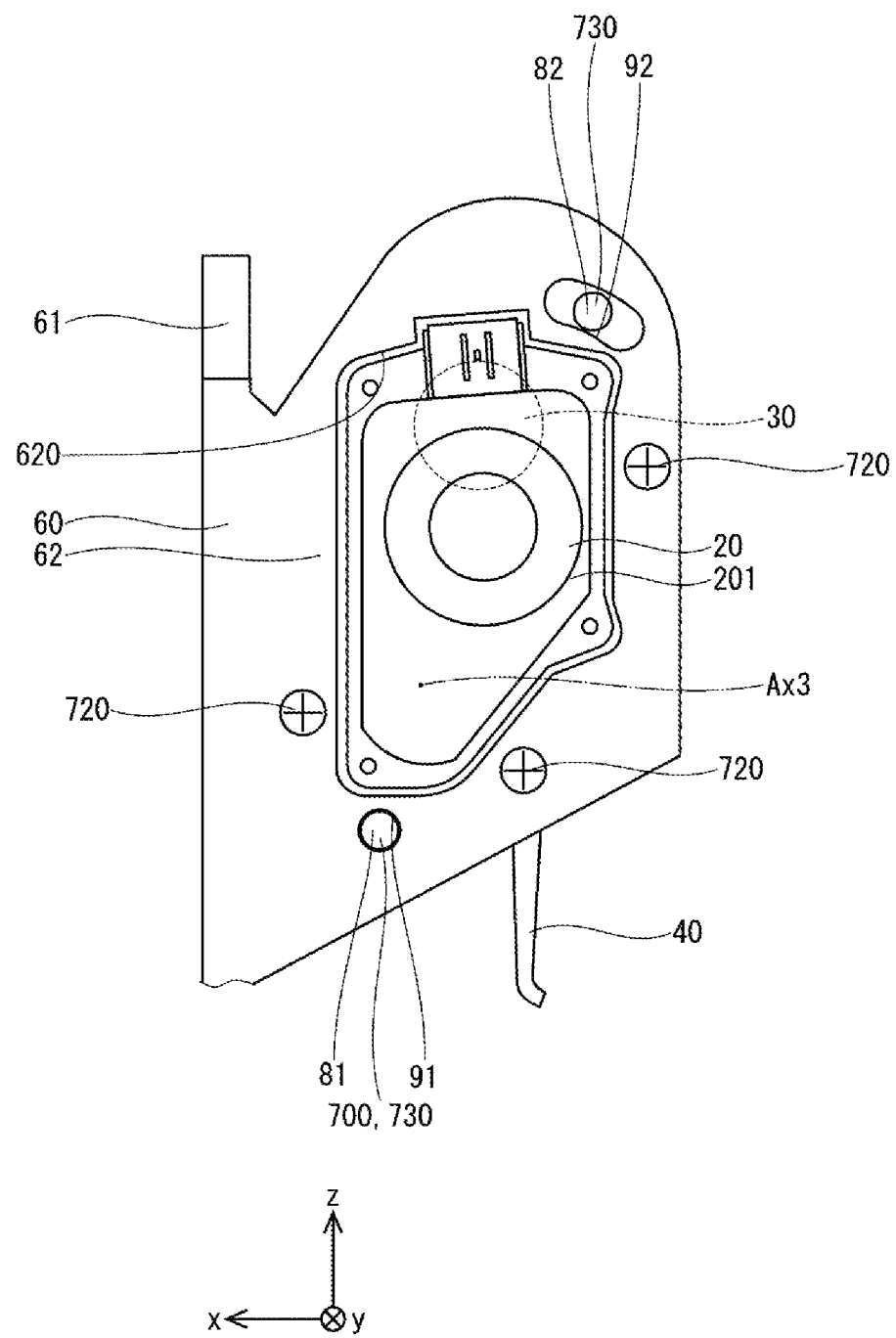
FIG. 10 is a diagram showing a part of the reaction force imparting device of a sixth embodiment.
Figure 11:
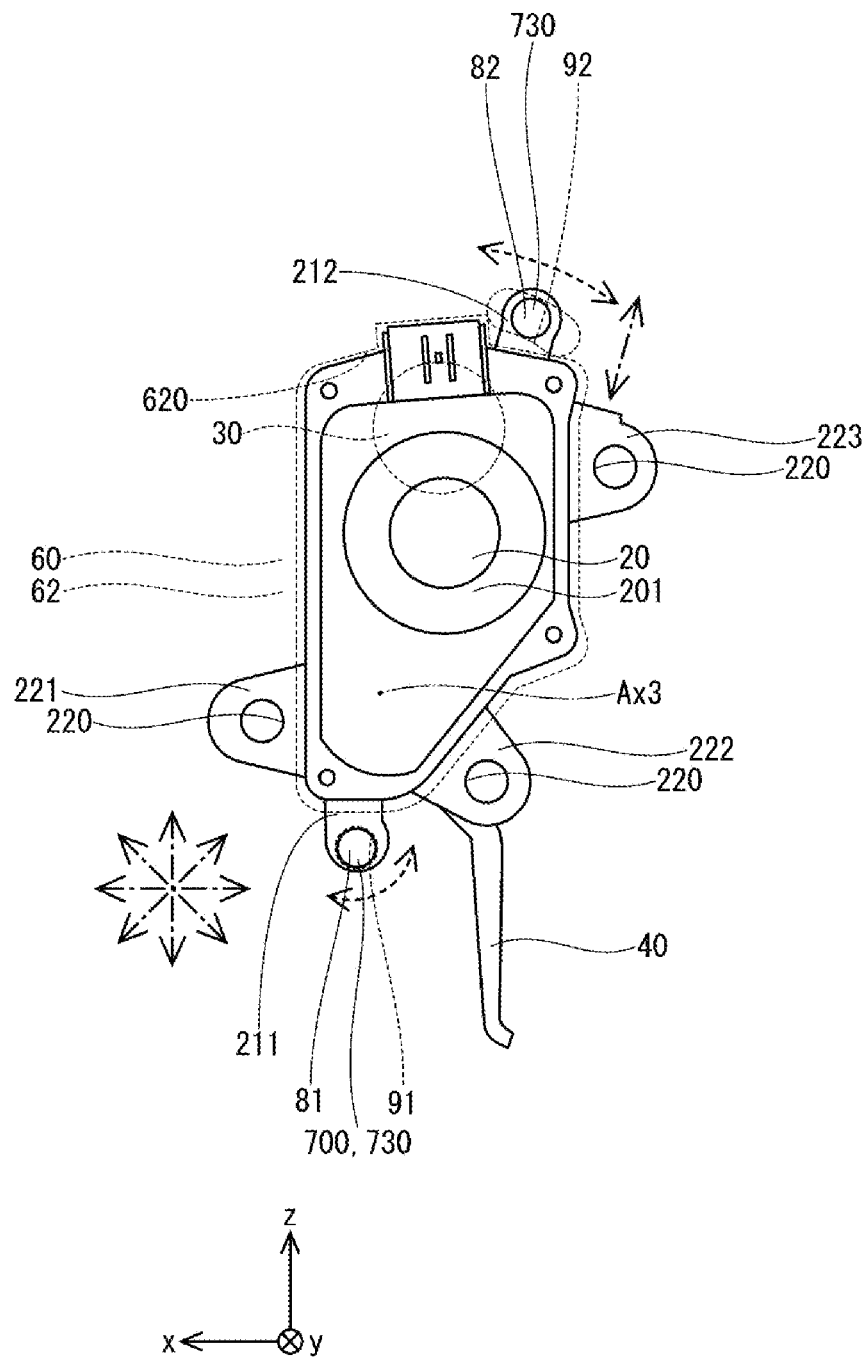
FIG. 11 is a diagram showing a part of the reaction force imparting device of the sixth embodiment.

A part of the reaction force imparting device according to a sixth embodiment is shown in FIGS. 10 and 11. The sixth embodiment differs from the first embodiment in the configuration of the positioning portion 700.

In the present embodiment, the positioning portion 700 has at least one position adjustment part 730 each consisting of a boss provided on either the actuator housing 20 or the fixing member 60 or a hole provided on the other of the actuator housing 20 and the fixing member 60 so that the boss can be inserted therein, and has at least one fastening part 720 that fastens the actuator housing 20 and the fixing member 60.

The position adjustment part 730 adjusts the relative rotational position of the boss with respect to the hole, or the relative position of the boss with respect to the hole in the direction perpendicular to the axis of the boss, and adjusts the relative position of the actuator housing 20 with respect to the fixing member 60.

More specifically, the positioning portion 700 has two position adjustment parts 730 and three fastening parts 720. One of the two position adjustment parts 730 is made up of a boss 81 and a hole 91. The boss 81 is formed to protrude in a cylindrical shape from the housing extension portion 211 of the actuator housing 20 (see FIG. 11). The hole 91 is formed at a predetermined distance from the housing corresponding hole 620 so as to penetrate the fixing member wall portion 62 of the fixing member 60 in a circular manner (see FIG. 10). An inner diameter of the hole 91 is slightly larger than an outer diameter of the boss 81. The hole 91 is formed into which the boss 81 can be inserted.

The other of the two position adjustment parts 730 is made up of a boss 82 and a hole 92. The boss 82 is formed to protrude in a cylindrical shape from the housing extension portion 212 of the actuator housing 20 (see FIG. 11). The hole 92 is formed at a predetermined distance from the housing corresponding hole 620 so as to penetrate the fixing member wall portion 62 of the fixing member 60 in an arc shape (see FIG. 10). The hole 92 is formed so that the center of the arc along the hole 92 coincides with the center of the boss 81. The size of the arc of the hole 92 in the radial direction is slightly larger than the outer diameter of the boss 82. The hole 92 is formed into which the boss 82 can be inserted.

FIG. 11 shows a state of the fixing member wall portion 62 and the actuator housing 20 when the boss 81 is inserted into the hole 91 and the boss 82 is inserted into the hole 92. Although the hole 91 allows a relative rotation of the boss 81 with respect to the hole 91, it restricts a relative movement in the radial direction of the boss 81 with respect to the hole 91. On the other hand, although the hole 92 allows the relative movement (rotation) of the boss 82 with respect to the hole 92 with the center of the boss 81 as the center of rotation and restricts the relative movement of the boss 82 with respect to the hole 92 in the radial direction of circular arc of the hole 92. That is, the position adjustment part 730 is configured to be able to adjust the relative rotational positions of the bosses 81 and 82 with respect to the holes 91 and 92. In the present embodiment, the relative position of the actuator housing 20 with respect to the fixing member 60 can be adjusted to any position by rotating the actuator housing 20 relative to the fixing member wall portion 62 with the center of the boss 81 as the rotation center.

In FIG. 11, the dashed arrows indicate the directions of relative movement and relative rotation of the bosses 81, 82 with respect to the holes 91, 92, which are permitted by the position adjustment part 730. The dashed-dotted arrow indicates the direction of relative movement or relative rotation of the bosses 81 and 82 with respect to the holes 91 and 92, which is regulated by the position adjustment part 730.

As described above, in the present embodiment, the positioning portion 700 is provided with at least one position adjustment part 730 each consisting of a boss provided on either the actuator housing 20 or the fixing member 60 and a hole provided on the other of the actuator housing 20 or the fixing member 60 so that the boss can be inserted therein, and also has at least one fastening part 720 that fastens the actuator housing 20 and the fixing member 60.

The position adjustment part 730 adjusts the relative rotational position of the boss with respect to the hole, or the relative position of the boss with respect to the hole in the direction perpendicular to the axis of the boss, and adjusts the relative position of the actuator housing 20 with respect to the fixing member 60.

In the present embodiment, the actuator housing 20 can be fixed to the fixing member 60 while adjusting the relative rotational position of the actuator housing 20 with respect to the fixing member 60. Therefore, the contact position Pt1 between the arm 50 and the lever 40 can be determined with higher accuracy. Therefore, the accuracy of the reaction force applied to the pedal 120 of the accelerator device 100 can be further improved.

Seventh Embodiment

Figure 12:
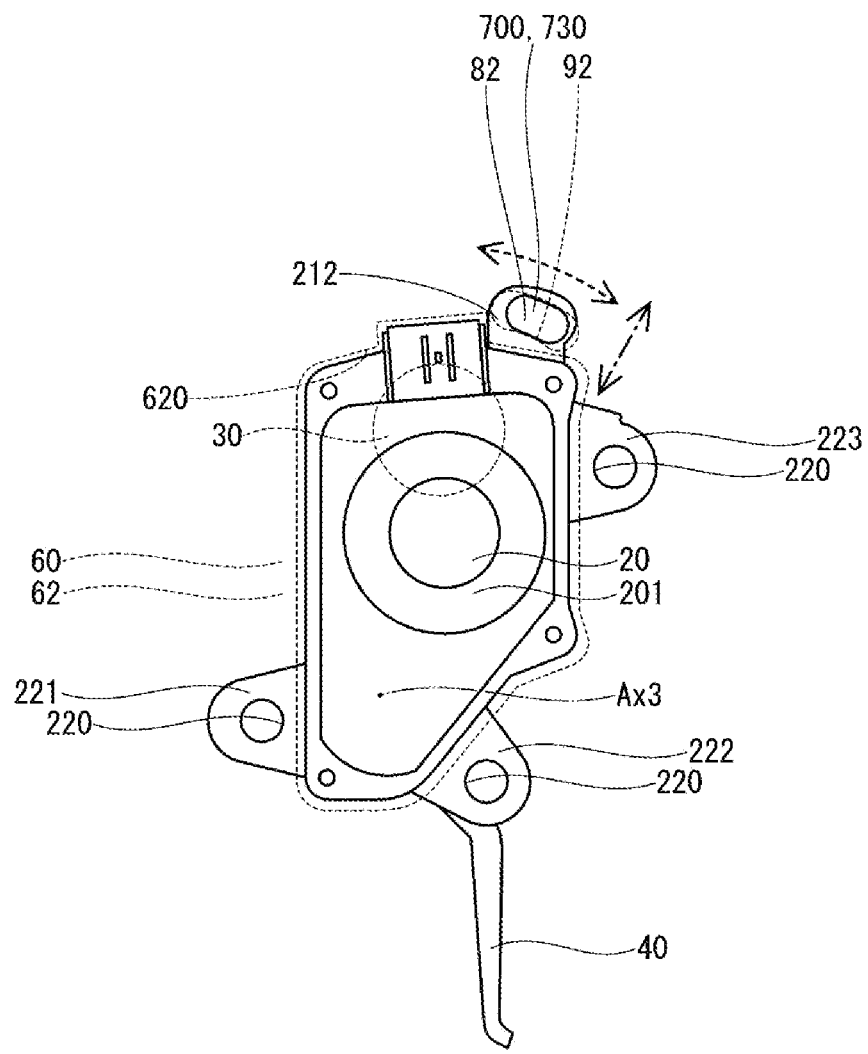
FIG. 12 is a diagram showing a part of the reaction force imparting device of a seventh embodiment.

A part of the reaction force imparting device according to a seventh embodiment is shown in FIG. 12. The seventh embodiment differs from the sixth embodiment in the configuration of the positioning portion 700.

Furthermore, in the present embodiment, the positioning portion 700 is provided with one position adjustment part 730 consisting of a boss provided on either the actuator housing 20 or the fixing member 60 and a hole provided on the other of the actuator housing 20 or the fixing member 60 so that the boss can be inserted therein, and also has at least one fastening part 720 that fastens the actuator housing 20 and the fixing member 60.

The position adjustment part 730 adjusts the relative rotational position of the boss with respect to the hole, or the relative position of the boss with respect to the hole in the direction perpendicular to the axis of the boss, and adjusts the relative position of the actuator housing 20 with respect to the fixing member 60.

More specifically, the positioning portion 700 has one position adjustment part 730 and three fastening parts 720. The position adjustment part 730 includes a boss 82 and a hole 92. The boss 82 is formed to protrude from the housing extension portion 212 of the actuator housing 20.

In the present embodiment, the hole 92 is formed to penetrate the fixing member wall portion 62 of the fixing member 60 in an arc shape. The hole 92 is formed so that the center of the arc along the hole 92 coincides with the rotation axis Ax3 of the lever 40. The boss 82 is formed so that a cross-sectional shape taken along a plane perpendicular to the axis of the boss 82 is arcuate. The size of the circular arc of the hole 92 in the radial direction is slightly larger than the size of the circular arc of the boss 82 in the radial direction. The size of the circular arc of the hole 92 in the circumferential direction is larger than the size of the circular arc of the boss 82 in the circumferential direction. The hole 92 is formed into which the boss 82 can be inserted.

In the present embodiment, the actuator housing 20 does not have the housing extension portion 211.

FIG. 12 shows the state of the fixing member wall portion 62 and the actuator housing 20 when the boss 82 is inserted into the hole 92. Although the hole 92 allows the relative movement (rotation) of the boss 82 with respect to the hole 92 around the rotation axis Ax3 of the lever 40, the hole 92 restricts the relative movement of the boss 82 with respect to the hole 92 in the radial direction of the circular arc of the hole 92 and the relative rotation of the boss 82 with respect to the hole 92. In the present embodiment, the relative position of the actuator housing 20 with respect to the fixing member 60 can be adjusted to any position by rotating the actuator housing 20 relative to the fixing member wall portion 62 with the rotation axis Ax3 of the lever 40 as the rotation center.

In FIG. 12, the dashed arrows indicate the directions of relative movement and relative rotation of the boss 82 with respect to the hole 92, which are permitted by the position adjustment part 730. The dashed-dotted arrow indicates the direction of relative movement or relative rotation of the boss 82 with respect to the holes 92, which is regulated by the position adjustment part 730.

As described above, in the present embodiment, the positioning portion 700 is provided with one position adjustment part 730 consisting of a boss provided on either the actuator housing 20 or the fixing member 60 and a hole provided on the other of the actuator housing 20 or the fixing member 60 so that the boss can be inserted therein, and also has at least one fastening part 720 that fastens the actuator housing 20 and the fixing member 60.

Therefore, like the sixth embodiment, the actuator housing 20 can be fixed to the fixing member 60 while adjusting the relative rotational position of the actuator housing 20 with respect to the fixing member 60. Therefore, the accuracy of the reaction force applied to the pedal 120 of the accelerator device 100 can be further improved.

Eighth Embodiment

Figure 13:
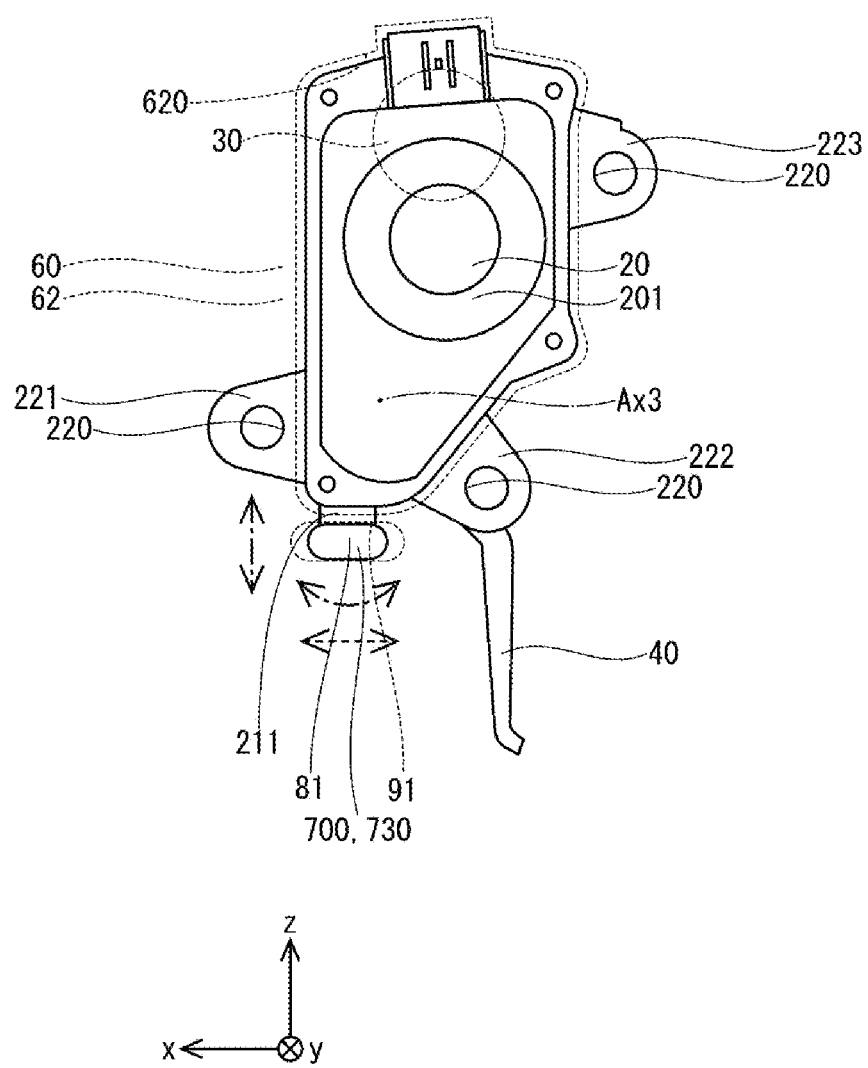
FIG. 13 is a diagram showing a part of the reaction force imparting device of an eighth embodiment.

A part of the reaction force imparting device according to an eighth embodiment is shown in FIG. 13. The eighth embodiment differs from the seventh embodiment in the configuration of the positioning portion 700.

Furthermore, in the present embodiment, the positioning portion 700 is provided with one position adjustment part 730 consisting of a boss provided on either the actuator housing 20 or the fixing member 60 and a hole provided on the other of the actuator housing 20 or the fixing member 60 so that the boss can be inserted therein, and also has at least one fastening part 720 that fastens the actuator housing 20 and the fixing member 60.

The position adjustment part 730 restricts the relative rotation of the boss with respect to the hole and adjusts the relative position of the boss with respect to the hole in the direction perpendicular to the axis of the boss and the relative position of the actuator housing 20 with respect to the fixing member 60.

More specifically, the positioning portion 700 has one position adjustment part 730 and three fastening parts 720. The position adjustment part 730 includes a boss 81 and a hole 91. The boss 81 is formed to protrude from the housing extension portion 211 of the actuator housing 20.

In the present embodiment, the hole 91 is formed to penetrate the fixing member wall portion 62 of the fixing member 60 in the rounded rectangular shape. The hole 91 is formed such that a line along a longer side direction is parallel to the x-axis. The boss 81 is formed such that the cross-sectional shape taken along a plane perpendicular to the axis of the boss 81 has the rounded rectangular shape. The boss 81 is formed such that a line along the longer side direction of the cross section of the boss 81 is parallel to the x-axis. A line along the longer side direction of the hole 91 substantially coincides with a line along the longer side direction in the cross section of the boss 81. The inner diameter of the hole 91 in the shorter side direction is slightly larger than the outer diameter in the shorter side direction in the cross section of the boss 81. The inner diameter of the hole 91 in the longer side direction is larger than the outer diameter in the longer side direction in the cross section of the boss 81. The hole 91 is formed into which the boss 81 can be inserted.

FIG. 13 shows the state of the fixing member wall portion 62 and the actuator housing 20 when the boss 81 is inserted into the hole 91. The hole 91 allows the relative movement of the boss 81 with respect to the hole 91 in the longer side direction of the hole 91, but restricts the relative movement of the boss 81 with respect to the hole 91 in the shorter side direction of the hole 91 and the relative rotation of the boss 81 with respect to the hole 91. In the present embodiment, the relative position of the actuator housing 20 with respect to the fixing member 60 can be adjusted to any position by moving the actuator housing 20 relative to the fixing member wall portion 62 in the longer side direction of the hole 91.

In FIG. 13, the dashed arrows indicate the directions of relative movement and relative rotation of the boss 81 with respect to the hole 91, which are permitted by the position adjustment part 730. The dashed-dotted arrow indicates the direction of relative movement or relative rotation of the boss 81 with respect to the holes 91, which is regulated by the position adjustment part 730.

As described above, in the present embodiment, the positioning portion 700 is provided with one position adjustment part 730 consisting of a boss provided on either the actuator housing 20 or the fixing member 60 and a hole provided on the other of the actuator housing 20 or the fixing member 60 so that the boss can be inserted therein, and also has at least one fastening part 720 that fastens the actuator housing 20 and the fixing member 60.

The position adjustment part 730 restricts the relative rotation of the boss with respect to the hole and adjusts the relative position of the boss with respect to the hole in the direction perpendicular to the axis of the boss and the relative position of the actuator housing 20 with respect to the fixing member 60.

In the present embodiment, the actuator housing 20 can be fixed to the fixing member 60 while adjusting the relative position of the actuator housing 20 with respect to the fixing member 60 with a relatively simple configuration. Therefore, the contact position Pt1 between the arm 50 and the lever 40 can be determined with higher accuracy. Therefore, the accuracy of the reaction force applied to the pedal 120 of the accelerator device 100 can be further improved.

Ninth Embodiment

Figure 14:
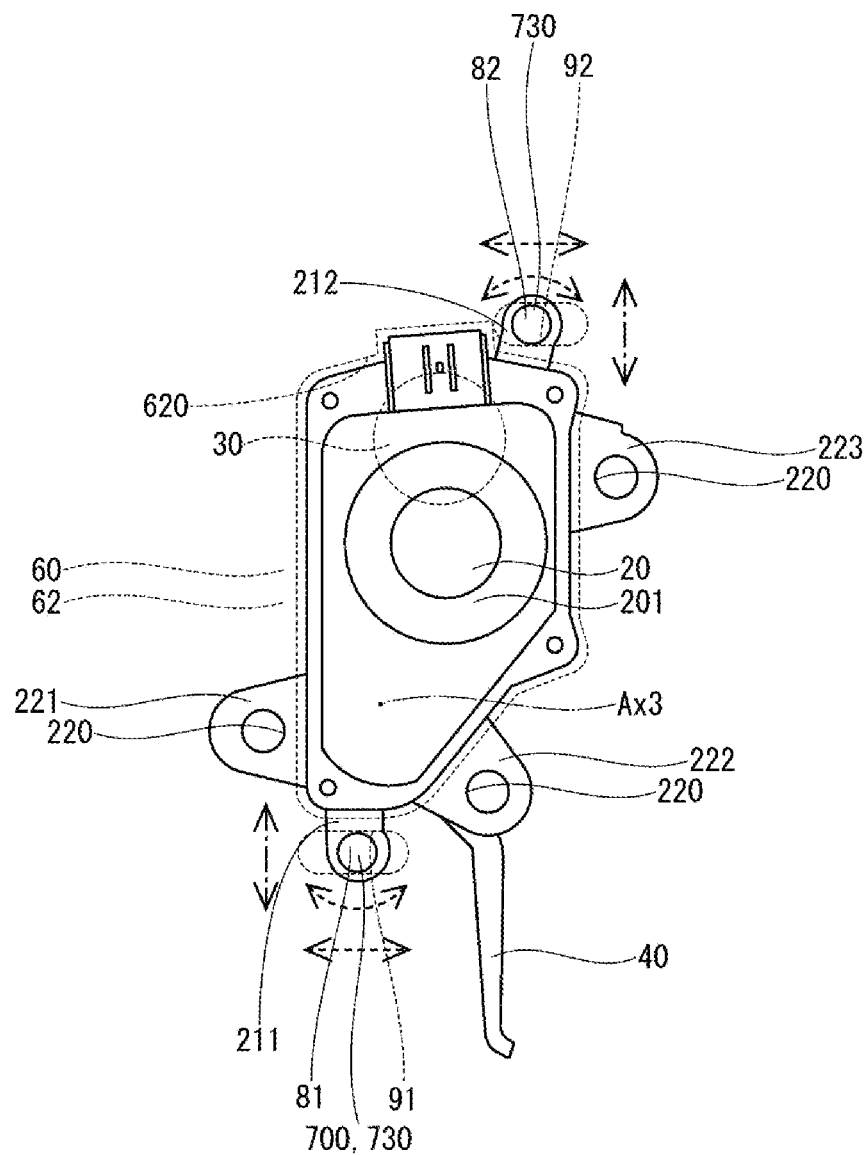
FIG. 14 is a diagram showing a part of the reaction force imparting device according to a ninth embodiment.

A part of the reaction force imparting device according to a ninth embodiment is shown in FIG. 14. The ninth embodiment differs from the eighth embodiment in the configuration of the positioning portion 700.

Furthermore, in the present embodiment, the positioning portion 700 is provided with a plurality of position adjustment parts 730 each consisting of a boss provided on either the actuator housing 20 or the fixing member 60 and a hole provided on the other of the actuator housing 20 or the fixing member 60 so that the boss can be inserted therein, and also has at least one fastening part 720 that fastens the actuator housing 20 and the fixing member 60.

The position adjustment part 730 adjusts the relative position of the boss with respect to the hole in the direction perpendicular to the axis of the boss, and adjusts the relative position of the actuator housing 20 with respect to the fixing member 60.

More specifically, the positioning portion 700 has two position adjustment parts 730 and three fastening parts 720. One of the two position adjustment parts 730 is made up of a boss 81 and a hole 91. The boss 81 is formed to protrude in a cylindrical shape from the housing extension portion 211 of the actuator housing 20. The hole 91 is formed to penetrate the fixing member wall portion 62 of the fixing member 60 in the rounded rectangular shape. The hole 91 is formed such that a line along a longer side direction is parallel to the x-axis. An inner diameter of the hole 91 in a lateral direction is slightly larger than an outer diameter of the boss 81. The hole 91 is formed into which the boss 81 can be inserted.

The other of the two position adjustment parts 730 is made up of a boss 82 and a hole 92. The boss 82 is formed to protrude in a cylindrical shape from the housing extension portion 212 of the actuator housing 20. The hole 92 is formed to penetrate the fixing member wall portion 62 of the fixing member 60 in the rounded rectangular shape. The hole 92 is formed such that a line along a longer side direction is parallel to the x-axis. An inner diameter of the hole 92 in a lateral direction is slightly larger than an outer diameter of the boss 82. The hole 92 is formed into which the boss 82 can be inserted.

FIG. 14 shows a state of the fixing member wall portion 62 and the actuator housing 20 when the boss 81 is inserted into the hole 91 and the boss 82 is inserted into the hole 92. The hole 91 allows the relative rotation of the boss 81 with respect to the hole 91 and the relative movement of the boss 81 with respect to the hole 91 in the longer side direction of the hole 91, but restricts the relative movement of the boss 81 with respect to the hole 91 in the shorter side direction of the hole 91. On the other hand, although the hole 92 allows the relative rotation of the boss 82 with respect to the hole 92 and the relative movement of the boss 82 with respect to the hole 92 in the longer side direction of the hole 92, it restricts the relative movement of the boss 82 with respect to the hole 92 in a shorter side direction of the hole 92. That is, the position adjustment part 730 is configured to be able to adjust the relative positions of the bosses 81 and 82 with respect to the holes 91 and 92 in a direction perpendicular to the axes of the bosses 81 and 82. In the present embodiment, the relative position of the actuator housing 20 with respect to the fixing member 60 can be adjusted to any position by moving the actuator housing 20 relative to the fixing member wall portion 62 in the longer side direction of the holes 91 and 92.

As described above, in the present embodiment, the positioning portion 700 is provided with a plurality of position adjustment parts 730 each consisting of a boss provided on either the actuator housing 20 or the fixing member 60 and a hole provided on the other of the actuator housing 20 or the fixing member 60 so that the boss can be inserted therein, and also has at least one fastening part 720 that fastens the actuator housing 20 and the fixing member 60.

The position adjustment part 730 adjusts the relative position of the boss with respect to the hole in the direction perpendicular to the axis of the boss, and adjusts the relative position of the actuator housing 20 with respect to the fixing member 60.

In the present embodiment, the positioning portion 700 has a plurality of position adjustment parts 730 spaced apart by a predetermined distance, so that the contact position Pt1 between the arm 50 and the lever 40 can be determined more accurately. Therefore, the accuracy of the reaction force applied to the pedal 120 of the accelerator device 100 can be further improved.

Other Embodiments

The plurality of embodiments described above may be implemented in combination unless there is a structural impediment factor. For example, the accelerator device of the second embodiment and the reaction force imparting device of the third to ninth embodiments may be combined.

Furthermore, in the above-described embodiments, an example is shown in which the boss is provided in the actuator housing, which is either the actuator housing or the fixing member, and the hole is provided in the fixing member, which is the other of the actuator housing or the fixing member. On the other hand, in other embodiments, either the actuator housing or the fixing member may be provided with the boss, and the other of the actuator housing or the fixing member may be provided with the hole.

In other embodiments, the positioning portions is not limited to having one or two position regulating parts, but may have three or more. Further, the positioning portion is not limited to having one or two position adjustment parts, but may have three or more.

Moreover, in the above-described embodiments, an example was shown in which the reaction force imparting device includes the lock portion that can restrict the rotation of the pedal by restricting the rotation of the lever. On the other hand, in other embodiments, the reaction force imparting device may not include the lock portion.

In other embodiments, the wall surface of the floor panel of the vehicle to which the reaction force imparting device and the accelerator device are attached may not be formed parallel to the yz plane. That is, the wall surface of the floor panel may be formed at any angle with respect to the vehicle.

Thus, the present disclosure is not limited to the above embodiments but can be implemented in various forms without departing from the scope thereof.

The present disclosure has been described based on the embodiments. However, the present disclosure is not limited to the embodiments and structures. The present disclosure also encompasses various modifications and variations within the scope of equivalents. Furthermore, various combination and formation, and other combination and formation including one, more than one or less than one element may be made in the present disclosure.

What is claimed is:

1. An accelerator operation mechanism attached to a vehicle, comprising:
    an accelerator device including a pedal that is depressed by a driver and a pedal housing that rotatably supports the pedal;
    a reaction force imparting device configured to impart a reaction force to the pedal against a depression force of the driver; and
    a fixing member to which the accelerator device and the reaction force imparting device are fixed at a distance; wherein
    the reaction force imparting device includes:
    an actuator housing;
    an actuator provided in the actuator housing;
    a lever that is provided in the actuator housing, rotates by a driving force from the actuator, contacts the pedal or an arm rotating together with the pedal, and imparts the reaction force to the pedal against the depression force of the driver; and
    a positioning portion that determines a contact position between the pedal or the arm and the lever and between a rotation axis of the pedal and a rotation axis of the lever;
    the positioning portion is provided with a position regulating part that regulates a relative position of the actuator housing with respect to the fixing member and a fastening part that fastens the actuator housing and the fixing member,
    the position regulating part and the fastening part are located on the fixing member,
    the pedal housing is fixed to the fixing member by a mounting member, and
    the accelerator operation mechanism is attached to the vehicle by mounting the fixing member to the vehicle.

2. The accelerator operation mechanism according to claim 1, wherein
    the position regulating part consists of a boss provided on either the actuator housing or the fixing member and a hole provided on the other of the actuator housing or the fixing member so that the boss is inserted therein, and the position regulating part regulates a relative rotation of the boss with respect to the hole and a relative movement of the boss with respect to the hole in a direction perpendicular to an axis of the boss, and regulates a relative position of the actuator housing with respect to the fixing member.

3. The accelerator operation mechanism according to claim 1, wherein
the positioning portion is provided with a plurality of position regulating parts each consisting of a boss provided on either the actuator housing or the fixing member and a hole provided on the other of the actuator housing or the fixing member so that the boss is inserted therein, and
each position regulating part regulates a relative rotation of the boss with respect to the hole or a relative movement of the boss with respect to the hole in a direction perpendicular to an axis of the boss, and regulates a relative position of the actuator housing with respect to the fixing member.

4. The accelerator operation mechanism according to claim 1, wherein
the positioning portion is provided with at least one position adjustment part each consisting of a boss provided on either the actuator housing or the fixing member and a hole provided on the other of the actuator housing or the fixing member so that the boss is inserted therein, and
each position adjustment part adjusts a relative rotation position of the boss with respect to the hole or a relative position of the boss with respect to the hole in a direction perpendicular to an axis of the boss, and adjusts a relative position of the actuator housing with respect to the fixing member.

5. The accelerator operation mechanism according to claim 1, wherein
the positioning portion is provided with one position adjustment part consisting of a boss provided on either the actuator housing or the fixing member and a hole provided on the other of the actuator housing or the fixing member so that the boss is inserted therein, and
the position adjustment part restricts a relative rotation of the boss with respect to the hole and adjusts a relative position of the boss with respect to the hole in the direction perpendicular to the axis of the boss and a relative position of the actuator housing with respect to the fixing member.

6. The accelerator operation mechanism according to claim 1, wherein
the positioning portion is provided with a plurality of position adjustment parts each consisting of a boss provided on either the actuator housing or the fixing member and a hole provided on the other of the actuator housing or the fixing member so that the boss is inserted therein, and at least one fastening part that fastens the actuator housing and the fixing member, and
each position adjustment part adjusts a relative position of the boss with respect to the hole in a direction perpendicular to an axis of the boss, and adjusts a relative position of the actuator housing with respect to the fixing member.

7. The accelerator operation mechanism according to claim 1, further comprising,
a lock portion capable of regulating rotation of the pedal by regulating rotation of the lever.

8. A reaction force imparting device for imparting a reaction force against a depression force of a driver to a pedal of an accelerator device including the pedal to be depressed by the driver and a pedal housing rotatably supporting the pedal, the reaction force imparting device, comprising:
an actuator housing;
an actuator provided in the actuator housing;
a lever that is provided in the actuator housing, rotates by a driving force from the actuator, contacts the pedal or an arm rotating together with the pedal, and imparts the reaction force to the pedal against the depression force of the driver;
a fixing member that is formed to fix the pedal housing and the actuator housing apart from each other, and that is attachable to a vehicle; and
a positioning portion that determines a contact position between the pedal or the arm and the lever and between a rotation axis of the pedal and a rotation axis of the lever; wherein
the positioning portion is provided with at least one position adjustment part each consisting of a boss provided on either the actuator housing or the fixing member and a hole provided on the other of the actuator housing or the fixing member so that the boss is inserted therein, and at least one fastening part that fastens the actuator housing and the fixing member, and
each position adjustment part adjusts a relative rotation position of the boss with respect to the hole or a relative position of the boss with respect to the hole in a direction perpendicular to an axis of the boss, and adjusts a relative position of the actuator housing with respect to the fixing member.

9. A reaction force imparting device for imparting a reaction force against a depression force of a driver to a pedal of an accelerator device including the pedal to be depressed by the driver and a pedal housing rotatably supporting the pedal, the reaction force imparting device, comprising:
an actuator housing;
an actuator provided in the actuator housing;
a lever that is provided in the actuator housing, rotates by a driving force from the actuator, contacts the pedal or an arm rotating together with the pedal, and imparts the reaction force to the pedal against the depression force of the driver;
a fixing member that is formed to fix the pedal housing and the actuator housing apart from each other, and that is attachable to a vehicle; and
a positioning portion that determines a contact position between the pedal or the arm and the lever and between a rotation axis of the pedal and a rotation axis of the lever; wherein
the positioning portion is provided with one position adjustment part consisting of a boss provided on either the actuator housing or the fixing member and a hole provided on the other of the actuator housing or the fixing member so that the boss is inserted therein, and at least one fastening part that fastens the actuator housing and the fixing member, and
the position adjustment part restricts a relative rotation of the boss with respect to the hole and adjusts a relative position of the boss with respect to the hole in the direction perpendicular to the axis of the boss and a relative position of the actuator housing with respect to the fixing member.

10. A reaction force imparting device for imparting a reaction force against a depression force of a driver to a pedal of an accelerator device including the pedal to be depressed by the driver and a pedal housing rotatably supporting the pedal, the reaction force imparting device, comprising:
- an actuator housing;
- an actuator provided in the actuator housing;
- a lever that is provided in the actuator housing, rotates by a driving force from the actuator, contacts the pedal or an arm rotating together with the pedal, and imparts the reaction force to the pedal against the depression force of the driver;
- a fixing member that is formed to fix the pedal housing and the actuator housing apart from each other, and that is attachable to a vehicle; and
- a positioning portion that determines a contact position between the pedal or the arm and the lever and between a rotation axis of the pedal and a rotation axis of the lever; wherein
- the positioning portion is provided with a plurality of position adjustment parts each consisting of a boss provided on either the actuator housing or the fixing member and a hole provided on the other of the actuator housing or the fixing member so that the boss is inserted therein, and at least one fastening part that fastens the actuator housing and the fixing member, and
- each position adjustment part adjusts a relative position of the boss with respect to the hole in a direction perpendicular to an axis of the boss, and adjusts a relative position of the actuator housing with respect to the fixing member.

* * * * *